(12) United States Patent
Sann

(10) Patent No.: US 8,117,961 B2
(45) Date of Patent: *Feb. 21, 2012

(54) APPARATUS FOR THAWING FROZEN FOOD ITEMS

(75) Inventor: Melbourne H. Sann, Rome, NY (US)

(73) Assignee: Penguin Rapid Thawers LLC, Rome, NY (US)

( * ) Notice: Subject to any disclaimer, the term of this patent is extended or adjusted under 35 U.S.C. 154(b) by 1891 days.

This patent is subject to a terminal disclaimer.

(21) Appl. No.: 11/253,043

(22) Filed: Oct. 18, 2005

(65) Prior Publication Data

US 2006/0051477 A1 Mar. 9, 2006

Related U.S. Application Data

(63) Continuation-in-part of application No. 10/653,446, filed on Sep. 2, 2003, now abandoned.

(51) Int. Cl.
*A23B 4/10* (2006.01)
(52) U.S. Cl. .............................. 99/516; 99/339; 99/349
(58) Field of Classification Search ............ 99/325–333, 99/339, 340, 483, 352–355, 444–450, 467–479, 99/489–491, 516–536; 211/88.01, 126, 126.5, 211/126.15
See application file for complete search history.

(56) References Cited

U.S. PATENT DOCUMENTS

| | | | |
|---|---|---|---|
| 1,059,597 A | 4/1913 | Clair | |
| 1,850,031 A | 3/1932 | Rayson | |
| 2,906,620 A | 9/1959 | Jung | |
| 3,744,474 A | 7/1973 | Shaw | 126/20 |
| 3,790,391 A | 2/1974 | Bolleter et al. | 99/330 |
| 3,796,804 A | 3/1974 | Ballentine | 426/524 |
| 3,852,609 A * | 12/1974 | Peters | 345/70 |
| 3,942,426 A * | 3/1976 | Binks et al. | 99/473 |
| 3,943,842 A * | 3/1976 | Bills et al. | 99/473 |
| 4,011,805 A | 3/1977 | Vegh et al. | 99/467 |
| 4,062,277 A | 12/1977 | Powers | 99/483 |
| 4,072,762 A | 2/1978 | Rhodes | 426/510 |
| 4,110,916 A * | 9/1978 | Bemrose | 34/197 |

(Continued)

FOREIGN PATENT DOCUMENTS

JP 01141542 A * 6/1989

(Continued)

OTHER PUBLICATIONS

Office Action, dated as being mailed on Mar. 21, 2006 in U.S. Appl. No. 10/653,446.

*Primary Examiner* — Henry Yuen
*Assistant Examiner* — Vinod D Patel
(74) *Attorney, Agent, or Firm* — Wood, Herron & Evans, LLP

(57) ABSTRACT

An apparatus for thawing frozen food items includes an enclosure having a top wall, a bottom wall, and a side wall extending between the top and bottom walls and defining a thawing chamber. One of the walls includes an access opening to the thawing chamber. A closure associated with the enclosure is movable between opened and closed positions wherein the thawing chamber is accessible through the access opening when in the opened position and the closure covers the access opening when in the closed position. A showerhead is adapted to discharge a shower of water onto frozen food items held by the receptacle.

21 Claims, 18 Drawing Sheets

U.S. PATENT DOCUMENTS

| | | | |
|---|---|---|---|
| 4,173,215 A * | 11/1979 | Bureau et al. | 126/369 |
| 4,233,892 A | 11/1980 | Hawkins | |
| 4,244,979 A * | 1/1981 | Roderick | 426/418 |
| 4,281,636 A | 8/1981 | Vegh et al. | 126/369 |
| 4,331,070 A * | 5/1982 | Denk | 99/483 |
| 4,483,243 A * | 11/1984 | Cote | 99/468 |
| 4,509,545 A | 4/1985 | Trotter | 134/199 |
| 4,531,306 A * | 7/1985 | Erickson | 34/546 |
| 4,571,341 A | 2/1986 | Sugimura | 426/510 |
| 4,579,051 A * | 4/1986 | Berrens | 99/468 |
| 4,582,047 A | 4/1986 | Williams | 126/369 |
| 4,646,630 A * | 3/1987 | McCoy et al. | 99/468 |
| 4,655,192 A | 4/1987 | Jovanovic | 126/20 |
| 4,701,340 A | 10/1987 | Bratton et al. | 426/511 |
| 4,727,801 A | 3/1988 | Yokoi et al. | |
| 4,821,649 A * | 4/1989 | Andersson | 108/107 |
| 4,906,485 A | 3/1990 | Kirchhoff | 426/506 |
| 4,924,072 A | 5/1990 | Oslin | 219/401 |
| 4,991,545 A | 2/1991 | Rabe et al. | 122/382 |
| 5,147,425 A | 9/1992 | Hueber | |
| 5,184,538 A | 2/1993 | Ledet | 99/331 |
| 5,223,696 A | 6/1993 | Violi | 219/401 |
| 5,285,719 A | 2/1994 | McFadden et al. | |
| 5,368,008 A | 11/1994 | Oslin | 126/20.2 |
| 5,442,997 A | 8/1995 | Branz et al. | 99/330 |
| D362,101 S | 9/1995 | Maddux et al. | D34/20 |
| 5,517,980 A | 5/1996 | Cappello et al. | 126/20 |
| 5,549,038 A | 8/1996 | Kolvites | 99/330 |
| 5,665,412 A | 9/1997 | Fuller et al. | 426/524 |
| 5,689,837 A | 11/1997 | Katona | |
| 5,968,574 A * | 10/1999 | Sann | 426/510 |
| 6,260,580 B1 | 7/2001 | Shipley | |
| 6,844,530 B2 | 1/2005 | Bennett et al. | |
| 6,894,252 B2 * | 5/2005 | Paller et al. | 219/400 |
| 2004/0066835 A1 * | 4/2004 | Drews | 374/135 |

FOREIGN PATENT DOCUMENTS

| | | | |
|---|---|---|---|
| JP | 2000116316 A | * | 4/2000 |
| JP | 2000262264 A | * | 9/2000 |

* cited by examiner

APPARATUS FOR THAWING FROZEN FOOD ITEMS

CROSS-REFERENCE TO RELATED APPLICATIONS

This is a continuation-in-part of application Ser. No. 10/653,446, filed Sep. 2, 2003 now abandoned, which is hereby incorporated by reference herein in its entirety.

FIELD OF THE INVENTION

The invention relates generally to apparatus and methods for thawing frozen food items and, in particular, relates to apparatus and methods for sanitarily thawing frozen food items with temperature-regulated water and optional air convection.

BACKGROUND OF THE INVENTION

Most residential dwellings and commercial establishments have a kitchen equipped for the preparation and cooking of food. In commercial kitchens and restaurants, professional chefs may prepare dozens of different dishes each day that require a number of ingredients in their recipes. To prepare so many different dishes, restaurants must keep large supplies of food on hand; not only fresh foods, but also frozen foods that must be thawed before a chef may prepare a meal. Food is commonly frozen both for transportation and to prolong the effective life of the food between the time it is harvested or processed and the time it is served.

Restaurants may plan ahead by thawing expected amounts of frozen food before the frozen food is required to be cooked. While demand for certain meals may remain fairly regular and the need for ingredients may be anticipated, at times when restaurants run specials on certain dishes, when business fluctuates, etc., demand for dishes and their ingredients becomes uncertain. It is this uncertainty of demand that requires restaurants to keep a great deal of their food frozen and ready to be thawed for an appetite not yet sated because frozen food spoils, especially if thawed at high temperatures.

Conventional food thawers are not optimally suited for thawing food in contemporary professional kitchens in which a chef and kitchen staff need to satisfy demand for meals listed on a restaurant's menu in a timely manner, whether or not the ingredients needed for those dishes are fresh or, as so often is the case, frozen. The contemporary professional kitchen must comply with local or state rules and regulations to ensure that when frozen food is thawed, the thawing process is sanitary and, resultantly, preserves customer health safety.

Generally, restaurants are not allowed to simply immerse frozen food in a water bath for thawing, regardless of whether the water bath is either agitated or filtered and recycled. Contemporary professional kitchens are also prohibited from placing frozen food directly on a food preparation surface, or even a dedicated thawing surface, to allow the food to thaw in the open air at the kitchen's ambient temperature. These thawing practices are generally banned from professional kitchens because they present potential health risks to the restaurant's customers, e.g., they are likely to promote bacterial growth.

Certain conventional thawing devices are powered electrically to operate fans, heating elements, or steam generators. Other conventional thawing devices are used to thaw already prepared foods or foods in frozen containers, but lack the ability to thaw different types of raw foods simultaneously. Therefore, such conventional thawing devices pose a greater likelihood of cross-contamination and foreign substance contamination.

Three procedures are generally recognized as being acceptable for thawing food in a professional kitchen. First, food may be removed from a freezer and placed in a refrigerator to thaw. This procedure is rather slow due to the relatively low refrigerator temperature and does not allow a kitchen to meet a sudden demand for a certain dish that requires ingredients still in the freezer. In fact, it generally takes several hours for frozen food to be adequately thawed when using this procedure.

In a second generally recognized procedure, frozen food may be placed in a microwave oven and defrosted. Although this procedure is significantly quicker than thawing food in a refrigerator, thawing food in a microwave oven has drawbacks. Because raising the temperature of food very quickly from its frozen state promotes bacterial growth, microwaved food must then be cooked immediately. Microwaved food also often results in the deterioration of the food's quality, e.g., dehydration, "hot spots," and inadvertent "cooking" of portions of the food. In addition, purchasing and/or dedicating a microwave oven for food thawing can be expensive if, for example, a restaurant microwave oven under heavy usage breaks down and needs repair. Additionally, the inconvenience of dedicating a microwave oven for thawing food is often impractical. In addition, microwaved food cannot be refrozen and must be either prepared and served or discarded after thawing.

Finally, a professional kitchen may thaw frozen food by placing the food in a sink and running water over the food, all the while allowing the water to drain away from the food. This procedure requires a stream of water at a temperature suitable to warm the frozen food, typically less than 70° F., provided by a cold water tap. However, the frozen food may thaw too quickly and unevenly, and bacterial growth may be promoted. Moreover, a user must attend to the stream of water, as the food thaws, to ensure uniform thawing. Of course, while the user is attending to the thawing food, other kitchen duties are ignored. To prevent cross-contamination, only a single type of food may be placed in the sink at any time. For example, a single stream of water could not be used to thaw shrimp and chicken simultaneously due to the potential for cross-contamination.

These and other methods that utilize the kitchen sink in conjunction with thawing exclude the sink from being used for its intended purpose. The demand for frozen food to be thawed usually comes during peak business hours when the sinks are filled with solutions to wash, rinse, and/or sanitize and are being used for cleaning pots and pans. In addition to the interruption in sink use, the solutions must be drained, wasting water, time, and solution chemicals. The sink must also be sanitized before and after thawing if the frozen food being thawed comes in contact with sink surfaces, thus preventing cross-contamination and bacterial growth.

It would be desirable, therefore, to provide a food thawing device and food thawing methods that overcome these and other deficiencies of conventional thawing devices and methods.

SUMMARY

The invention is directed to a food thawing device or food thawer and methods of thawing frozen items, such as frozen food. In one aspect, an apparatus for thawing a frozen food item includes an enclosure defining a thawing chamber, a first receptacle, a first showerhead and a closure. The apparatus of the invention is particularly suitable for thawing frozen foods in large commercial restaurants, institutional facilities and/or professional kitchens.

In one embodiment of the invention, an apparatus for thawing frozen food items includes an enclosure having a top wall, a bottom wall, and a side wall extending between the top and bottom walls and defining a thawing chamber. One of the walls includes an access opening to the thawing chamber. Advantageously, a closure, such as a door, associated with the enclosure is movable between opened and closed positions wherein the thawing chamber is accessible through the access opening when in the opened position and the closure covers the access opening when in the closed position. The apparatus further includes a receptacle, such as a thawing basket, disposed inside the thawing chamber and configured to hold frozen food items. A first showerhead is adapted to discharge a shower of water onto frozen food items held by the receptacle.

In another embodiment of the invention, an apparatus for thawing frozen food items includes an enclosure defining a thawing chamber with an inlet port and an outlet port, and a showerhead. The showerhead is adapted to discharge a shower of water onto frozen foods item in the thawing chamber. The apparatus further includes an air-moving device positioned in the inlet port and configured to force air into the thawing chamber and over the frozen food items for exhaust through the outlet port. A water conduit supplies a stream of the water to the first showerhead. A rotatable water wheel is drivingly coupled with the air-moving device. The water wheel is in communication with the water conduit so that the stream of the water drives the water wheel for powering the air-moving device.

In another embodiment of the invention, an apparatus for thawing frozen food items includes a plurality of enclosures respectively defining a plurality of thawing chambers and a plurality of showerheads adapted to discharge a shower of water, wherein each showerhead is dedicated to one of the thawing chambers. The apparatus further includes a water conduit hydraulically coupled with the showerheads and adapted to supply a stream of water to each of the showerheads.

In accordance with the principles of the invention, warmed water is distributed evenly over substantially the entire surface area of the frozen food items without a user having to attend to the thawing process. The temperature of the warmed water used to thaw the frozen food items is regulated to automatically maintain the selected highest optimum thawing temperature allowed by state and local codes. The warmed water employed to thaw the frozen food items is drained away, not recycled, while the frozen food items are still quickly and evenly thawed. The drained water may power optional fans located inside and outside the thawing chamber. The optional fans create a horizontal and vertical air flow forcing room temperature air in, around, and out of the thawing chamber, thereby using a convective process to thaw food and assisting the thawing action of the warmed water. The thawer may be powered without electricity, which eliminates the dangers and costs associated with electrical appliances, although the invention is not so limited.

In accordance with the principles of the invention, multiple different frozen food items may be safely thawed simultaneously without cross-contamination. In addition, other sources of cross-contamination or foreign contamination, such as from kitchen sinks, are eliminated, as the thawing device is self-contained. The thawing water is continuously drained from the thawing chamber so that the frozen food items undergoing thawing are never immersed in liquid but rather is exposed to a flowing stream. Temperatures of 70° F. or less, which comport with health department standards for food thawing, are utilized thereby decreasing bacterial growth within the frozen food items which are being thawed.

In accordance with one aspect of the invention, a thawing basket has a rigid frame including a flange and a first intermediate support coupled to the flange. A wire mesh outer shell is coupled to the frame and includes a cavity for holding the frozen food items and an opening for accessing the cavity. The thawing basket may further include a rack defining a plurality of food-receiving slots. Additionally, the thawing basket may include a plurality of standoffs for spacing the frozen food items away from the outer shell, which allows the warmed water to freely circulate over the entire surface of the food being thawed. In one aspect of the invention, the closure and thawing basket may be integrally formed to define a drawer for holding the frozen food items. In another aspect of the invention, water dripped from the thawing basket may be channeled to power connected vertical fans hanging from the basket bottom, which forces room temperature air in a vertical direction toward the bottom of the basket and upward through the basket interior.

The food thawers of the present invention do not require electricity to operate fans, heating elements, or steam generators, which represents a significant advantage over conventional food thawers. Furthermore, the food thawers of the present invention include an enclosure with a closure that facilitates access to the thawing chamber and that may be stored inside the enclosure when removed to open an access opening to the thawing chamber. The showerhead that showers the frozen food items with temperature-controlled thawing water is a separate and distinct structure from the closure so that the closure can be moved to open and close the access opening to the thawing chamber without manipulating or otherwise disturbing the showerhead.

These and other benefits and advantages of this invention shall become more apparent from the accompanying drawings and description thereof.

BRIEF DESCRIPTION OF THE FIGURES

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION OF THE INVENTION

Figure 1:
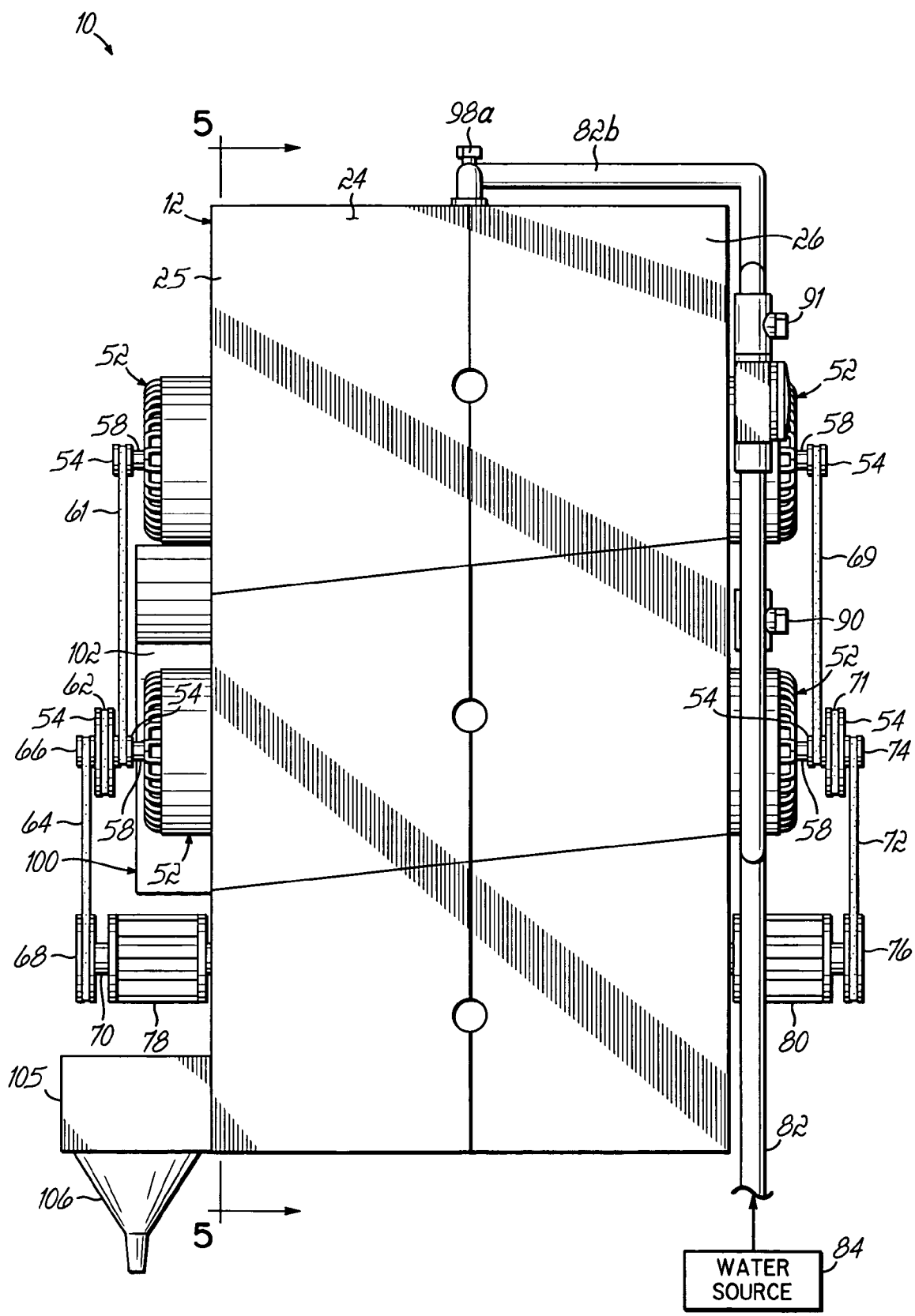
FIG. 1 is a front view of a food thawer in accordance with the principles of the invention.
Figure 2:
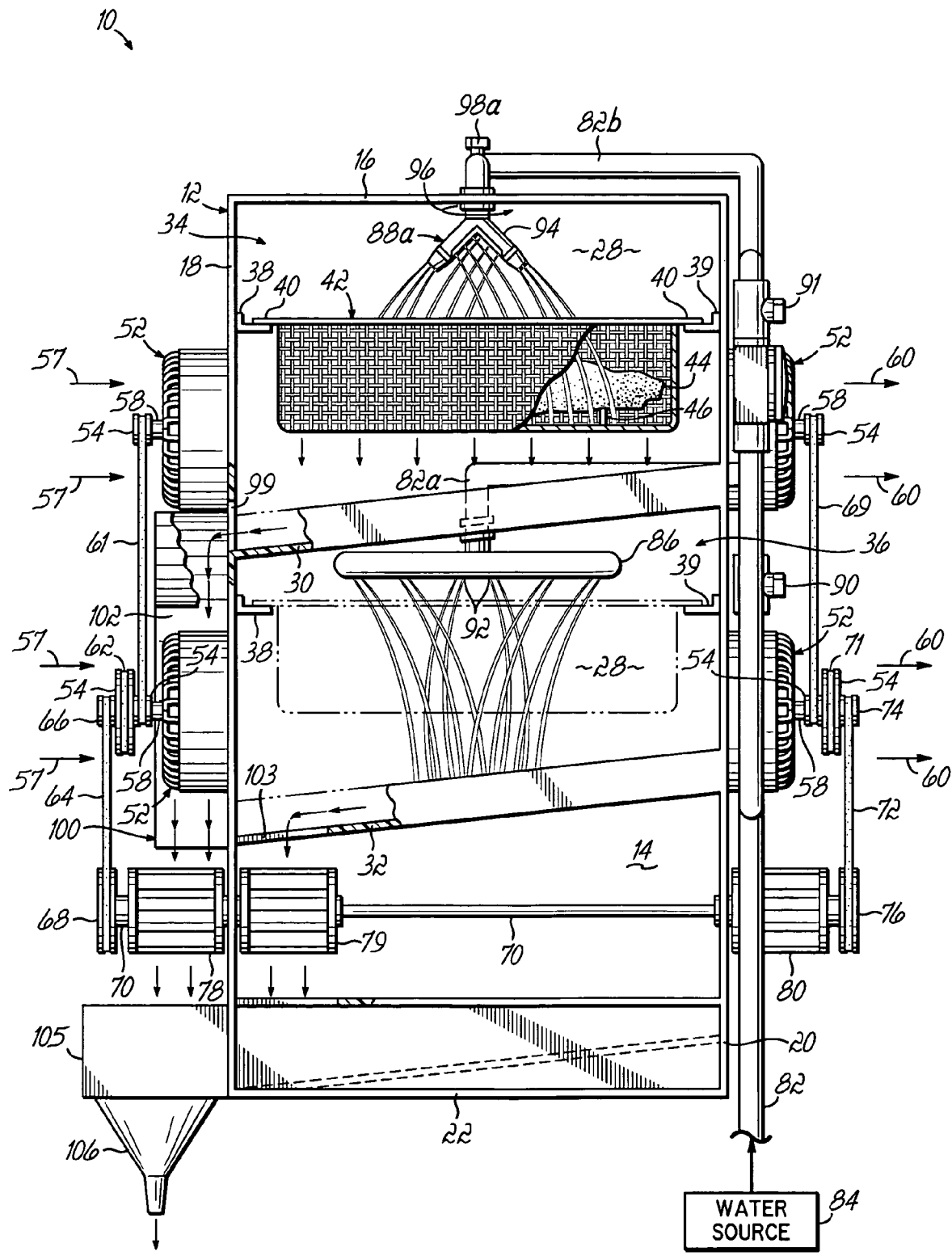
FIG. 2 is a partial cross-section view of the food thawer of FIG. 1.
Figure 3:
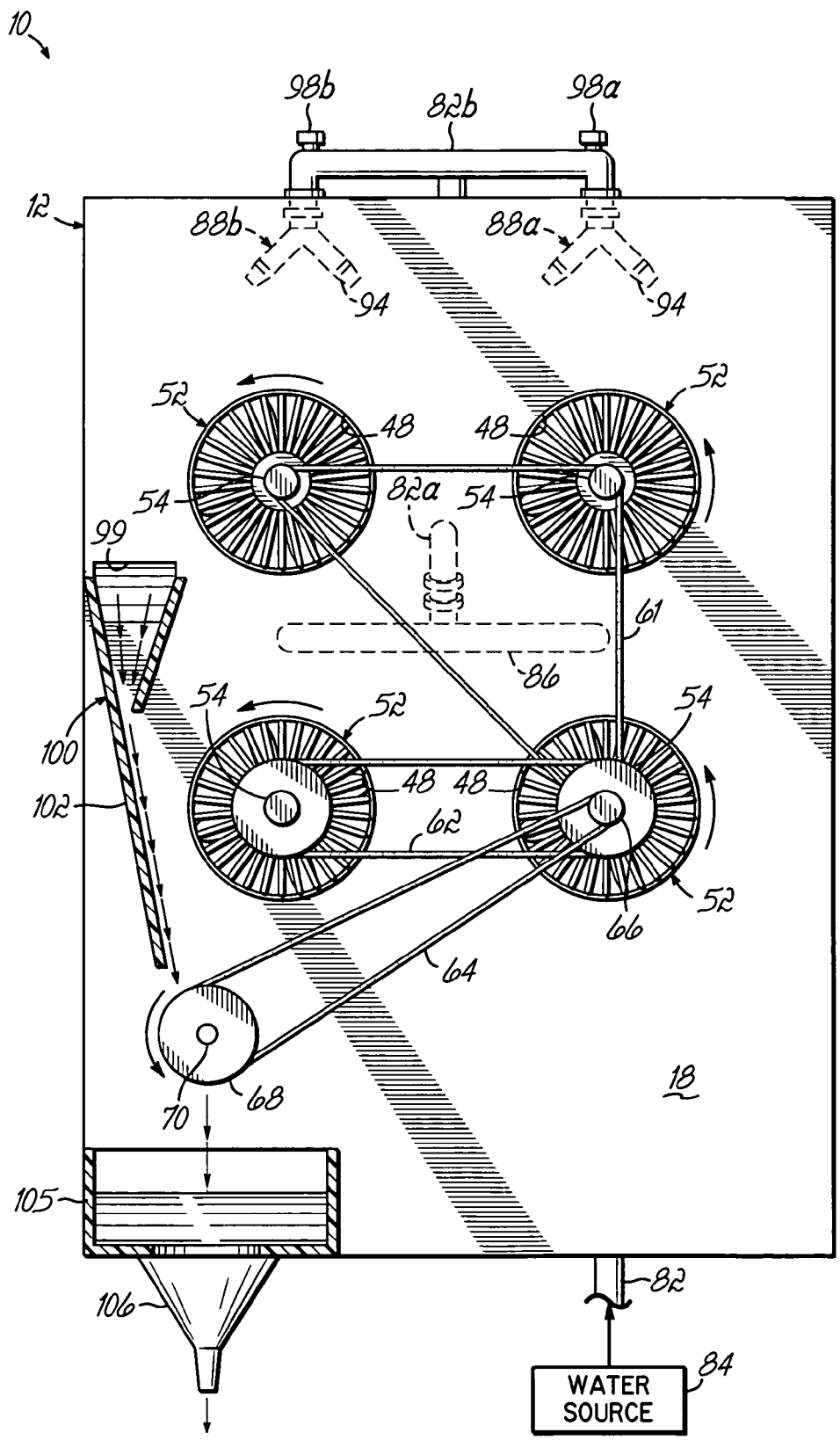
FIGS. 3 and 4 are side views of the food thawer of FIG. 1.
Figure 4:
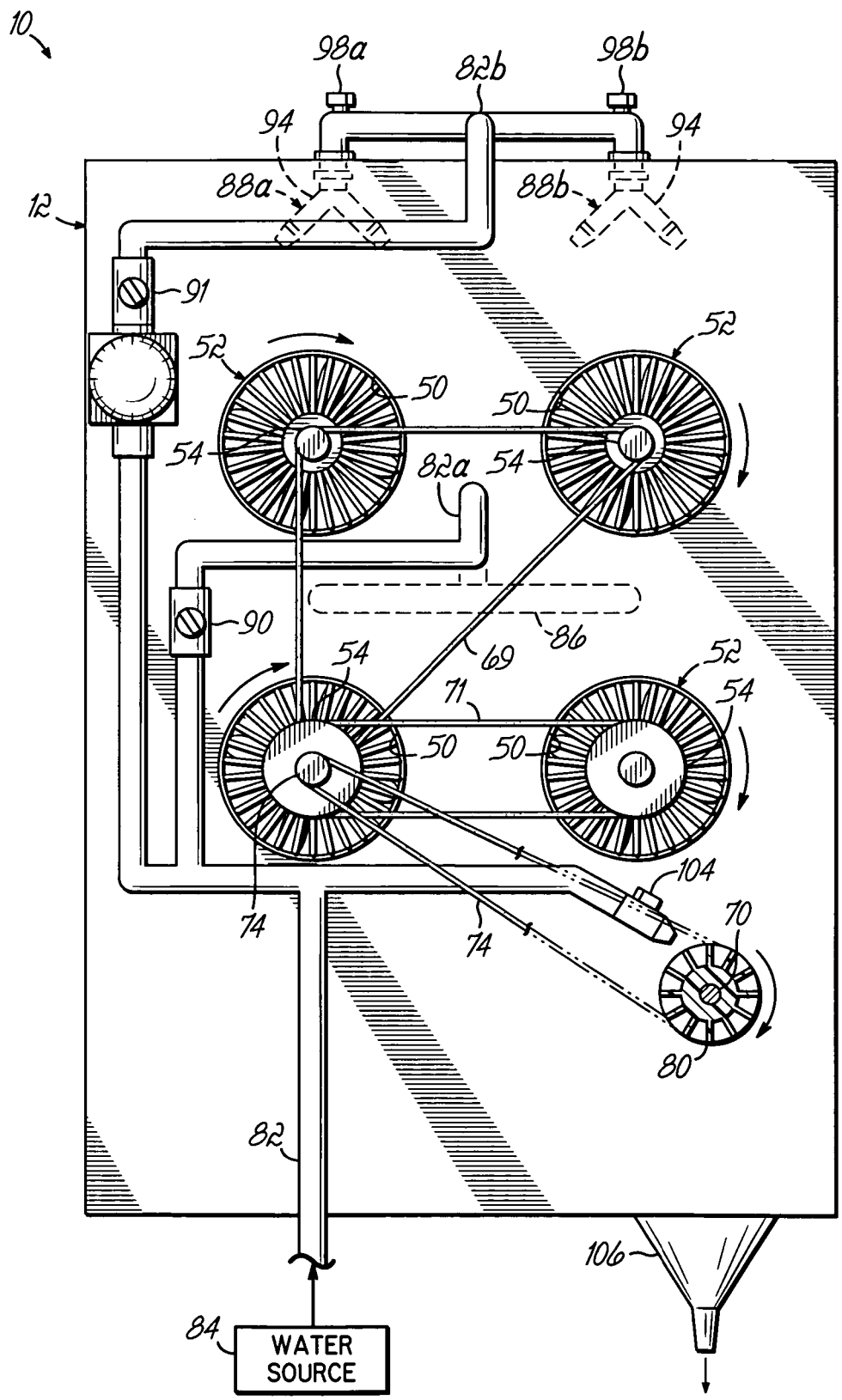
Figure 5:
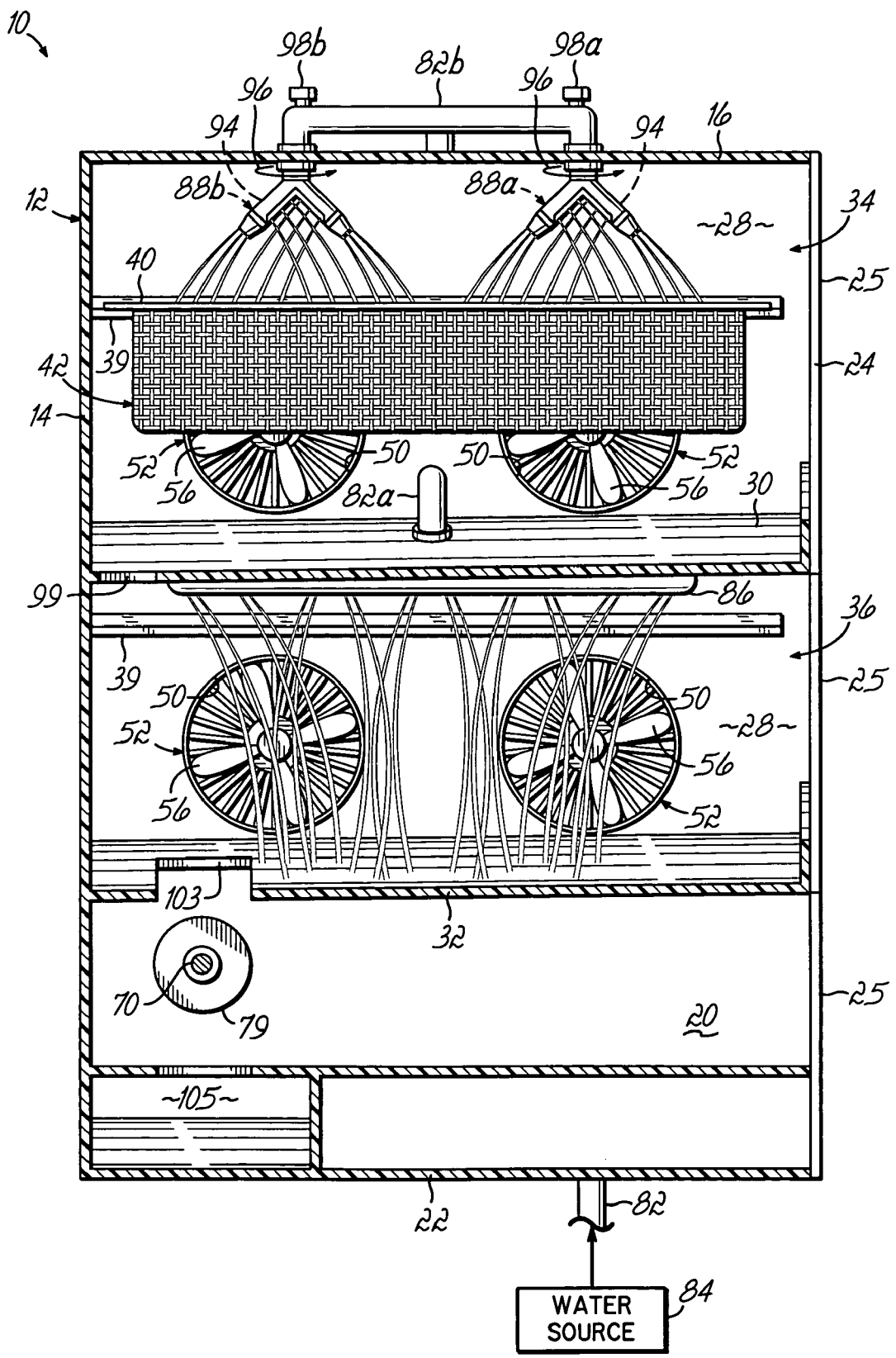
FIG. 5 is a cross-section view of the food thawer of FIG. 1.

The invention in various embodiments is directed to a food thawer primarily for residential and commercial thawing applications in restaurants, institutions, schools, hospitals, and the like. The food thawer can be used for thawing vegetables, shellfish, chicken, meats, and other frozen foods. The food thawer provides a fast, efficient and economical means for thawing large quantities of food. Moreover, the food thawer of this invention maintains the flavor, freshness, and returns the frozen food to its pre-frozen state. Importantly, the food is thawed in an even and consistent manner using only temperature-regulated tap water and room temperature air.

With reference to FIGS. 1-5, a food thawer 10 in accordance with the principles of the invention includes a cabinet or enclosure 12 having a rear wall 14, an upper or top wall 16, a pair of spaced side walls 18, 20, a lower or bottom wall 22, and a front wall 24 including opposed hinged doors 25, 26 that provide access to a thawing chamber 28 defined by the space enclosed by the walls 14, 16, 18, 20, 22, and 24. The enclosure 12 may be freestanding, as supported by legs for elevation above ground level, or may be attached to a support structure (not shown), such as a structural wall of a building. Typically, the enclosure 12 is formed of a plastic resin, although the invention is not so limited. In an alternative embodiment, the doors 25, 26 may be replaced by a single guillotine-type door that may be raised and lowered between open and closed positions to provide access to the thawing chamber 28. The dimensions of the thawing chamber 28 may be adjusted to correlate with a required thawing capacity.

The thawing chamber 28 is partitioned by inclined dividing walls 30, 32 into two distinct and separate compartments or tiers 34, 36 that are sealed from one another. Each of the dividing walls 30, 32 may have a sealed engagement about the corresponding peripheral with rear wall 14, side walls 18, 20, and front wall 24, or may be of unitary construction therewith. The number of tiers 34, 36 and dividing walls 30, 32 may be adjusted for varying the configuration of the thawing chamber 28. Provided in each of the tiers 34, 36 is a pair of rails 38, 39 in which one rail 38 is mounted to side wall 18 and the other rail 39 is mounted to the opposite side wall 20. The rails 38, 39 are configured to support one of a pair of support flanges 40 provided along the opposed side edges of a thawing basket 42, typically formed from an open wire mesh, into which a frozen food 44 is placed.

A thawing basket 42 is provided in each of the tiers 34, 36. Thawing baskets 42 are removable from the thawing chamber 28 by opening the doors 25, 26 and sliding each thawing basket 42 outwardly along the corresponding set of rails 38, 39. The invention contemplates that an additional pair of rails (not shown but similar to rails 38, 39) may be provided between rail 38 and rail 39 in either of the tiers 34, 36 for accommodating more than one individual thawing basket (not shown) of a reduced size for use in thawing smaller masses of frozen food 44. As the thawing baskets 42 are removable to distance the frozen food 44 therein from the rest of the enclosure 12, the food thawer 10 may be cleaned between thawing procedures simply by cleaning the thawing baskets 42 without necessarily cleaning interior surfaces exposed to the thawing water.

With continued reference to FIGS. 1-5, the open mesh framework of each thawing basket 42 permits efficient drainage of the thawing water sprayed on the frozen food 44. Generally, the frozen food 44 is at a temperature that is below the freezing point of water when placed into the thawing basket 42 and positioned in the thawing chamber 28. The frozen food 44 may be elevated above the wire mesh base of the thawing basket 42 by a plurality of vertically-projecting standoffs 46. This allows the thawing water and the flow of convective air to circulate freely over the entire surface area of the frozen food 44. Moreover, if the frozen food 44 is formed from an agglomerated mass of discrete portions, individual portions that break away from the agglomerated mass are captured in the space beneath the frozen food 44 provided by the standoffs 46. As the food being thawed incrementally breaks away from the agglomerated mass, the standoffs 46 allow more of a surface area of the food being thawed to be exposed to the thawing water and convective air, thereby decreasing the thawing time.

A plurality of, for example, four airflow inlet ports 48 are formed in side wall 18 and, similarly, a plurality of, for example, four airflow outlet ports 50 are formed in the opposite side wall 20. Two of the airflow inlet ports 48 and two of the airflow outlet ports 50 provide paths for cross-flow of convective air into each of the tiers 34, 36. Airflow inlet ports 48 are positioned directly on one side of the thawing basket 42 and airflow outlet ports 50 are positioned directly on an opposite side of the thawing basket 42, thereby forcing a flow of convective air through the thawing basket 42.

With continued reference to FIGS. 1-5, installed in each of the airflow inlet and outlet ports 48, 50 is one of a plurality of fans 52, which are generally identical, each having a pulley 54 and a plurality of fan blades 56 projecting radially outward from a spindle 58 coupled with the pulley 54. Fans 52 in the inlet ports 48 are oriented and driven such that fan rotation causes air to be forced from the environment surrounding the enclosure 12 into the thawing chamber 28, as generally indicated by arrows 57. Fans 52 in the outlet ports 50 are oriented and driven such that fan rotation causes air to be forced out of the thawing chamber 28 into the environment surrounding the enclosure 12, as generally indicated by arrows 60. As a result, the fans 52 in inlet ports 48 and the fans 52 in outlet ports 50 develop a cross-flow of convective air across the frozen food 44 in the thawing basket 42 when operating.

Preferably, each of the airflow inlet ports 48 is generally coaxial with one of the airflow outlet ports 50 in a direct line-of-sight arrangement, although the invention is not so limited. Coaxial alignment of the fans 52 affords the maximum convective airflow in each of the tiers 34, 36. The invention contemplates that the fans 52 in outlet ports 50 may be replaced by louvers or grills (not shown) arranged for establishing a cross-flow of air flow, while preventing the escape of thawing water splashed from the frozen food 44 out of the food thawer 10. Fans 52 may be positioned on an exterior side of the ports 48, 50 as shown in FIGS. 1-5, may be positioned on an interior side of the ports 48, 50, or may be positioned at an intermediate location.

With continued reference to FIGS. 1-5, convective air is continuously drawn by fans 52 located in inlet ports 48 into the thawing chamber 28 at room temperature, which in a commercial kitchen is generally in the range of about 70° F. to about 90° F., when the doors 25, 26 are shut and the fans 52 are powered. The room temperature convective air is forced across the exterior surface of the frozen food 44 held by the thawing basket 42, which is at a lower temperature than the convective air. Heat is transferred from the convective air to the frozen food 44, which cools the convective air and warms the frozen food 44. The cooled convective air is exhausted from the thawing chamber 28 through airflow outlet ports 50, which operates to cool the kitchen environment.

The pulleys 54 on the fans 52 coupled with inlet ports 48 are coupled together by flexible drive belts 61, 62 so that all pulleys 54 are driven by a common power source, as explained below. A drive belt 64 couples a second pulley 66 on one fan 52 from among the fans 52 on side wall 18 with a pulley 68 attached to one end of a drive shaft 70 extending between the side walls 18, 20 and rotatable. Similarly, the pulleys 54 on the fans 52 coupled with outlet ports 50 are coupled together by flexible drive belts 69, 71 so that all pulleys 54 are driven by a common power source, as explained below. A drive belt 72 couples a second pulley 74 on one fan 52 from among the fans on side wall 20 with a pulley 76 attached to an opposite end of the drive shaft 70.

With continued reference to FIGS. 1-5, one end of the drive shaft 70 extends outwardly through side wall 18 and carries a water wheel 78 that may be impinged by drained water from tier 34. Positioned in an open space inside enclosure 12 between bottom wall 22 and dividing wall 32 is a water wheel 79 that may be impinged by drained water from tier 36. An opposite end of the drive shaft 70 extends outwardly through side wall 20 and carries another water wheel 80 that may be impinged by a portion of the water provided from a regulated-temperature water source 84.

A thawing water conduit 82 couples the regulated-temperature water source 84 operative to supply thawing water at a constant temperature, typically about 70° F. or less to comport with safety rules but, in any event, warmer than the frozen food 44 being thawed, to the food thawer 10. The water source 84 includes a mixer (not shown) that combines or mixes hot tap water and cool tap water to supply a continuous stream of thawing water fixed at the constant water temperature.

The water conduit 82 includes a branch 82a coupled with a showerhead 86 in lower tier 36 and another independent branch 82b coupled with a pair of showerheads 88a,b in upper tier 34. Flow to branch 82a may be discontinued by a shut-off valve 90 positioned in the water conduit 82 and, similarly, flow to branch 82b may be discontinued by another shut-off valve 91 positioned in the water conduit 82. As a result, the tiers 34, 36 may be used individually or collectively. Regardless of the specific usage, the presence of the dividing walls 30, 32 eliminates cross-contamination between frozen foods 44 being thawed in different tiers 34, 36.

With continued reference to FIGS. 1-5, showerhead 86 is suspended generally above thawing basket 42 in tier 34 and has a plurality of orifices 92 facing downwardly toward the bottom wall 22. The orifices 92 are each oriented about the circumference of the showerhead 86 such that the shower of water is emitted from orifices 92 bathes substantially the entire cross-sectional area of the thawing basket 42, when viewed vertically in a direction extending from the top wall 16 to the bottom wall 22. As a result, thawing water is symmetrically distributed over a surface area of frozen food 44 confronting the showerhead 86 and thawing water is distributed over substantially all regions within the thawing basket 42.

Each of the showerheads 88a,b is suspended generally above thawing basket 42 in tier 34 and includes a pair of nozzles 94 from which multiple streams of water are emitted. Each of the showerheads 88a,b rotates in a direction generally indicated by arrow 96 when water is exhausted from the nozzles 94, as a reactionary force to the exhausted streams of water. As a result, the individual streams of water are moved about the thawing basket 42 to spray different regions of the thawing basket 42 and frozen food 44 held therein. A pair of shut-off valves 98a,b are provided of which valve 98a is operative for selectively blocking water flow to showerhead 88a and valve 98b is operative for selectively blocking water flow to showerhead 88b. The shut-off valves 98a,b may be used in conjunction with reduced-size thawing baskets 42 so that only a portion of tier 34 may be used to thaw frozen food 44, if desired, while conserving water.

The flow of thawing water over the frozen food 44 is continuous, which implies that the water bathing the frozen food 44 at any instant in time is at or near the controlled temperature. This contrasts with a conventional situation in which frozen food is immersed in a static bath in a kitchen sink during thawing. The frozen food continuously removes heat from the thawing water, which gradually reduces the temperature of the thawing water and thereby reduces the thawing efficiency. Therefore, the continuous flow of thawing water in accordance with the principles of the invention significantly improves the thawing efficiency.

The invention contemplates that multiple different showerheads and fan designs are within the spirit and scope of the invention specifically for directing and enhancing the water distribution and convective airflow.

With continued reference to FIGS. 1-5, thawing water originating from showerheads 88a,b is collected by the inclined dividing wall 30 and is drained by gravity from tier 34 through a drain opening 99 in side wall 18 into a substantially vertical spillway 100 located outside and adjacent to the side wall 18. An extended guide surface 102 of spillway 100 directs the drained water from tier 34 onto a downward turning side of water wheel 78. Similarly, thawing water originating from showerhead 86 is collected by the inclined dividing wall 32 and is drained by gravity from tier 36 through a drain opening 103 in dividing wall 32. The falling drain water is directed from tier 36, independent of water drained from tier 34, onto a downward turning side of water wheel 79. A bypass valve 104 may be provided in the water conduit 82 that is capable of switching a portion of the water flow from the water source 84 for powering the fans 52. Specifically, the bypass valve 104 diverts a portion of the water stream arriving from the water source 84 onto a downwardly turning side of the water wheel 80. The action of the drain water striking on the water wheels 78, 79 and, optionally, the source water flowing over water wheel 80 provides the power for rotating the fans 52 to provide the convective air flow through each tier 34, 36 of the thawing chamber 28. As a result, the food thawer 10 may be operated without electricity to provide the convective air or to distribute the thawing water over the frozen food 44. The only electricity that may be required for operation of the food thawer 10 is to heat the hot tap water used by the water source 84. In an alternative embodiment, the invention contemplates that the fans 52 may be electrically powered. The drained thawing water, after striking the water wheels 78, 79, is diverted by a drain tray 105 and a funnel shaped outlet 106 for disposal in a sanitary drain.

In use and with reference to FIGS. 1-5, the doors 25, 26 are opened, one of the thawing baskets 42 is withdrawn from the thawing chamber 28, a quantity of frozen food 44 is placed in the thawing basket 42, and the thawing basket 42 is returned to the thawing chamber 28. After the doors 25, 26 are shut to isolate the thawing chamber 28, a flow of water at the desired regulated temperature is initiated through the water conduit 82 and is directed to the appropriate tier, for example tier 34, in which the thawing basket 42 and frozen food 44 are disposed. The thawing water is discharged from the showerhead 86, with the rate that the water is exhausted defined by flow restrictions in the showerhead 86. The thawing water showers over at least the entire top surface cross-sectional area of the thawing basket 42 and, thus, the frozen food 44 to be thawed.

After the flow of thawing water is initiated, water draining from the tier 36 is channeled by the corresponding dividing wall 32 to water wheel 79, without cross-contaminating the other tier 36. The force of the draining water pouring down onto the water wheel 79 turns the water wheel 79 thereby powering the fans 52. In the alternative, the bypass valve 104 may be used to direct a portion of the incoming thawing water to another water wheel 80 for powering the fans 52. The rotation of the water wheel 79 drives the fans 52, which creates a cross-flow of convective air through the thawing chamber 28. The air cross-flow permeates the wire mesh of each perforated thawing basket 42 and flows across the surface of the frozen food 44, which assists or supplements the thawing action of temperature-regulated water from showerhead 86. It is appreciated that a similar description of the operation of the food thawer 10 applied to frozen food 44 placed in thawing basket 42 of tier 34 and to additional tiers (not shown) that may be added to the configuration of food thawer 10.

The food thawer of the invention may be operated in an unattended manner. Specifically, a user may then set a timer (not shown) either associated with the temperature-regulated water source or on the food thawer and leave the food thawer and frozen food unattended during that timed period because the showerheads and fans are free from the need for attendance and manipulation by the user.

In accordance with the principles of the invention, frozen food is thawed at an accelerated rate due to the combination of temperature-regulated water that is showered over the frozen food and the cross-flow of convective air. It has been observed that a five (5) pound block of frozen shrimp may be thawed in the food thawer in about ten (10) minutes or less, which is over an order of magnitude faster than an equivalent mass of frozen shrimp thawed by submersion in water in a kitchen sink. Another benefit of the invention is that the thawing baskets may be removed from the food thawer and individually cleaned. As a result, kitchen sinks do not have to be cleaned and sterilized to thaw food.

Figure 6:
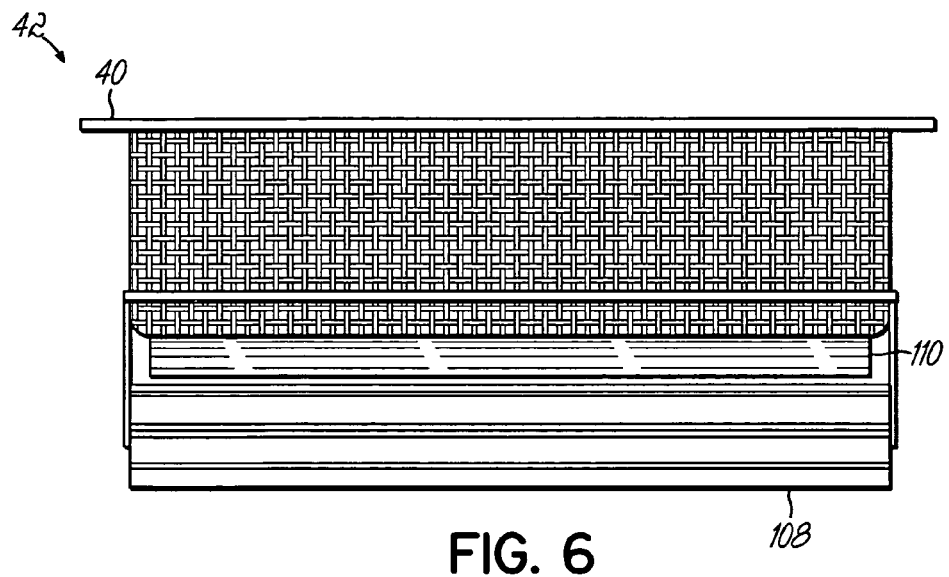
FIG. 6 is an end view of the thawing basket and the air-moving device of FIG. 1.
Figure 7:
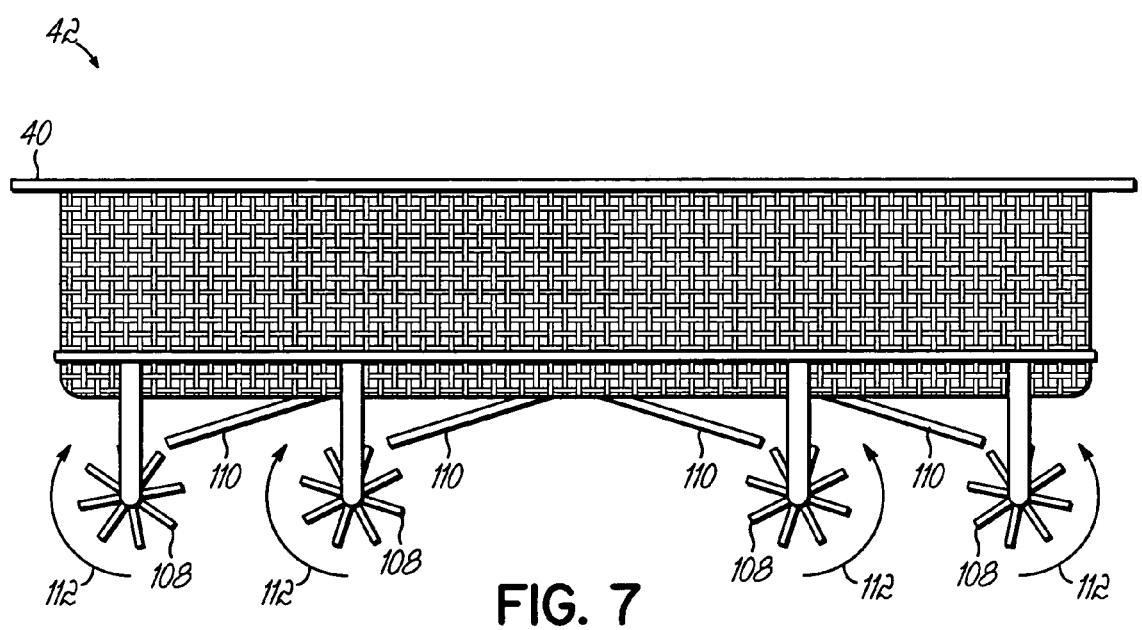
FIG. 7 is a side view of a thawing basket and the air-moving device of FIG. 6.

With reference to FIGS. 6 and 7 in which like reference numerals refer to like features in FIGS. 1-5 and in accordance with an alternative embodiment of the invention, the thawing basket 42 may be provided with a plurality rotatable paddle wheels or fans 108 and a corresponding plurality of drip plates 110. The fans 108 are removably-fastened to an underside of the thawing basket 42. Each of the drip plates 110 is inclined downwardly toward the bottom wall 22 for channeling water draining from the thawing basket 42 by gravity to a downwardly turning side of a corresponding one of the fans 108. The force of the draining water rotates the fans 108, which causes an upward airflow directed toward the bottom of the thawing basket 42 and a horizontal airflow, generally indicated by reference numeral 112. The upward airflow cooperates with the flow of convective air from fans 52 and the flow of thawing water from the showerheads 86, 88a,b to aid in thawing the frozen food 44.

Figure 8:
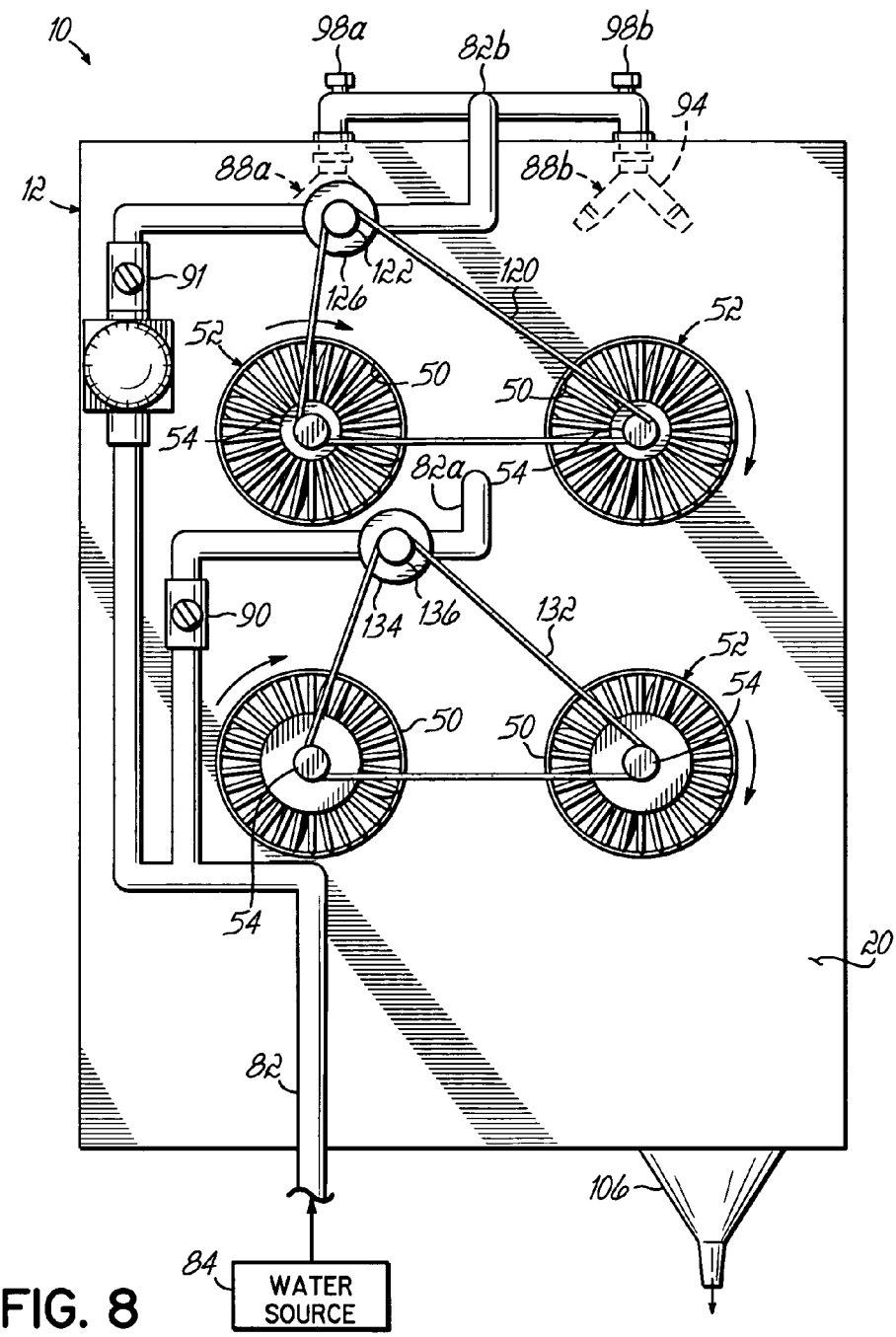
FIG. 8 is a side view similar to FIG. 4 of a food thawer in accordance with an alternative embodiment of the invention.
Figure 8A:
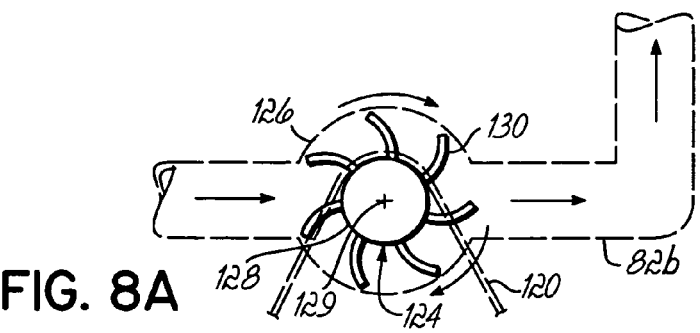
FIG. 8A is a side view of a portion of FIG. 8.

With reference to FIGS. 8 and 8A in which like reference numerals refer to like features in FIGS. 1-5 and in accordance with an alternative embodiment of the invention, fans 52 installed in the airflow outlet ports 50 extending through side wall 20 adjacent the upper tier 34 of thawing chamber 28 may be driven independently of fans 52 adjacent the lower tier 36 of thawing chamber 28. As a result, the forced exhaust of convective air from the upper tier 34 and the forced exhaust of convective air from the lower tier 36 are decoupled. Moreover, the fans 52 may be powered by temperature controlled water flowing in the water conduit 82, which is ultimately sprayed from showerheads 86, 88a,b and onto the frozen food 44 in lower and upper tiers 36, 34, respectively.

The pulleys 54 on the fans 52 servicing the upper tier 34 are operatively connected by a flexible drive belt 120 so that these pulleys 54 are driven by a shared power source. The drive belt 120 is further operatively connected with another pulley 122 that is coupled with a water wheel 124 locating inside of a sealed casing 126 that forms part of water conduit 82b. The water wheel 124 includes a central hub 128 that is rotatable about a central axis of rotation 129 and a plurality of curved vanes 130 that are connected at one end to the central hub 128.

The sealed casing 126 is coupled in-line with branch 82b of the water conduit 82 so that temperature-regulated water from water source 84 flowing through branch 82b transfers momentum to the curved vanes 130, which causes the central hub 128 of the water wheel 124 to rotate about the central axis of rotation 129. The curved vanes 130 are contoured to intercept the flowing water and, thereby, promote rotation. Rotation of the central hub 128 causes driven rotation of the pulley 122 that is exterior to the sealed casing 126 and, in turn, powers the drive belt 120. Movement of the drive belt 120 about the pulleys 54 transfers rotary power to the fans 52 servicing the upper tier 34. The operation of these fans 52 exhausts air from the enclosure 12. Shut-off valve 91 may be used to discontinue flow to branch 82b if the upper tier 34 is not in use for thawing frozen food 44.

Similarly, the pulleys 54 on the fans 52 servicing the lower tier 36 are operatively connected by a flexible drive belt 132 so that these pulleys 54 are driven by a shared power source. Branch 82a of the water conduit 82 also includes a sealed casing 134 that houses a water wheel (not shown) similar to water wheel 124 and an external pulley 136 that drivingly couples the water wheel with the drive belt 132. Powering the fans 52 using separate braches of water conduit 82 contributes to the independence of the exhaust of convective air from the lower tier 36 of food thawer 10 and the exhaust of convective air from the upper tier 34. Flow to branch 82a may also be discontinued by another shut-off valve 90 positioned in the water conduit 82.

A person having ordinary skill in the art will appreciate that the fans 52 on the air outlet ports 50 expel air from the upper and lower tiers 34, 36 of the food thawer 10 because of the direction in which the fans 52 are rotationally driven. If the fans 52 are driven in an opposite rotation sense, the air outlet ports 50 may be used to create a forced flow of ambient temperature air into the enclosure 12. Consequently, this aspect of the present invention applies equally for simultaneously powering the fans 52 installed in each of the airflow inlet ports 48 in side wall 18. As a consequence, the flow of convective air from the ambient environment into the upper tier 34 of food thawer 10 and the flow of convective air from the ambient environment into the lower tier 36 may be decoupled.

A drive shaft (not shown) similar to drive shaft 70 may extend between the side walls 18, 20 so that rotation of pulley 122 also supplies drive power to the fans 52 in the airflow inlet ports 48 of the upper tier 34. Similarly, a drive shaft (not shown) similar to drive shaft 70 may extend between the side walls 18, 20 so that rotation of pulley 136 supplies drive power to the fans 52 in the airflow inlet ports 48 of the lower tier 36.

Figure 9:
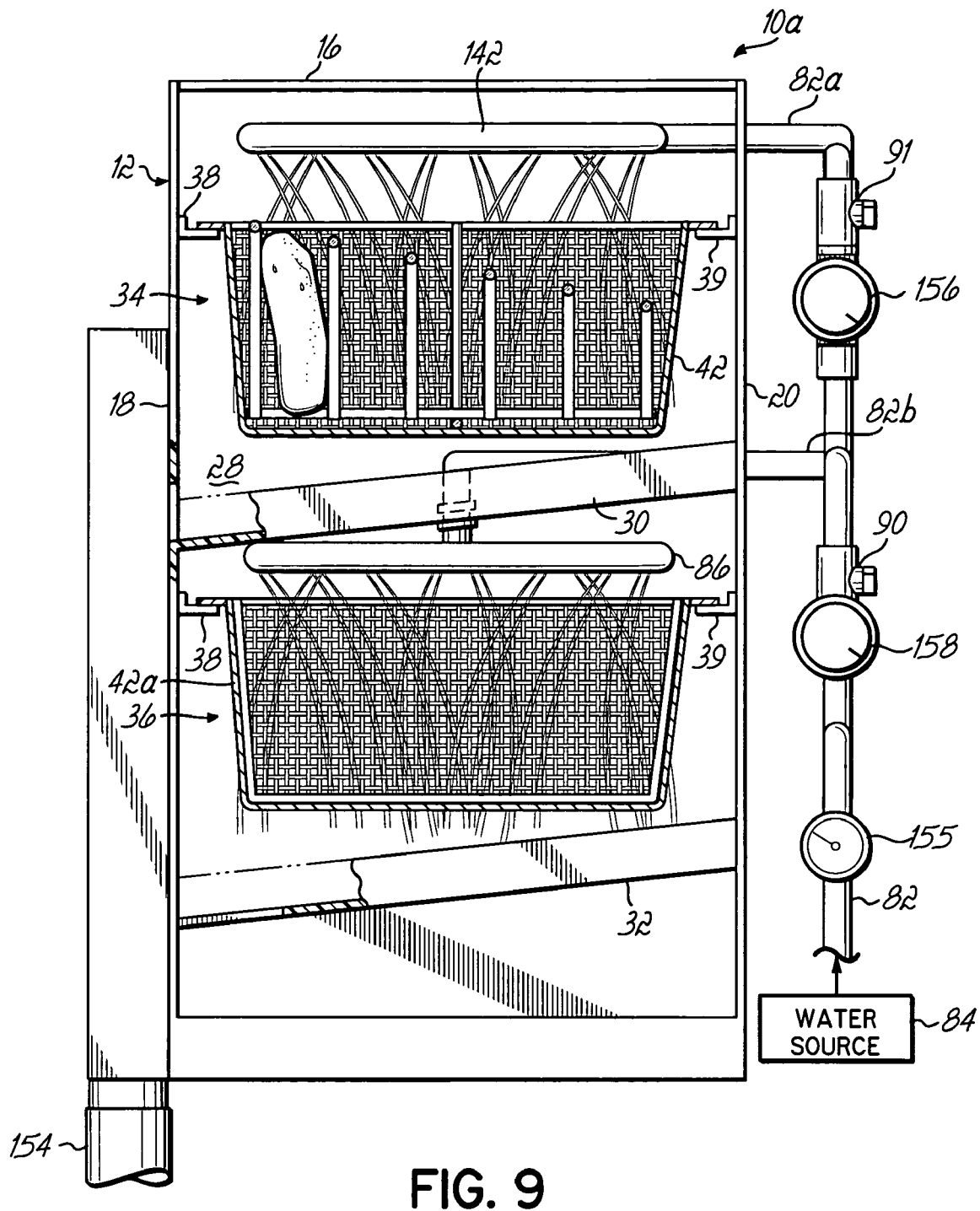
FIG. 9 is a front view of a food thawer in accordance with an alternative embodiment of the invention that is shown with the front door removed.
Figure 10:
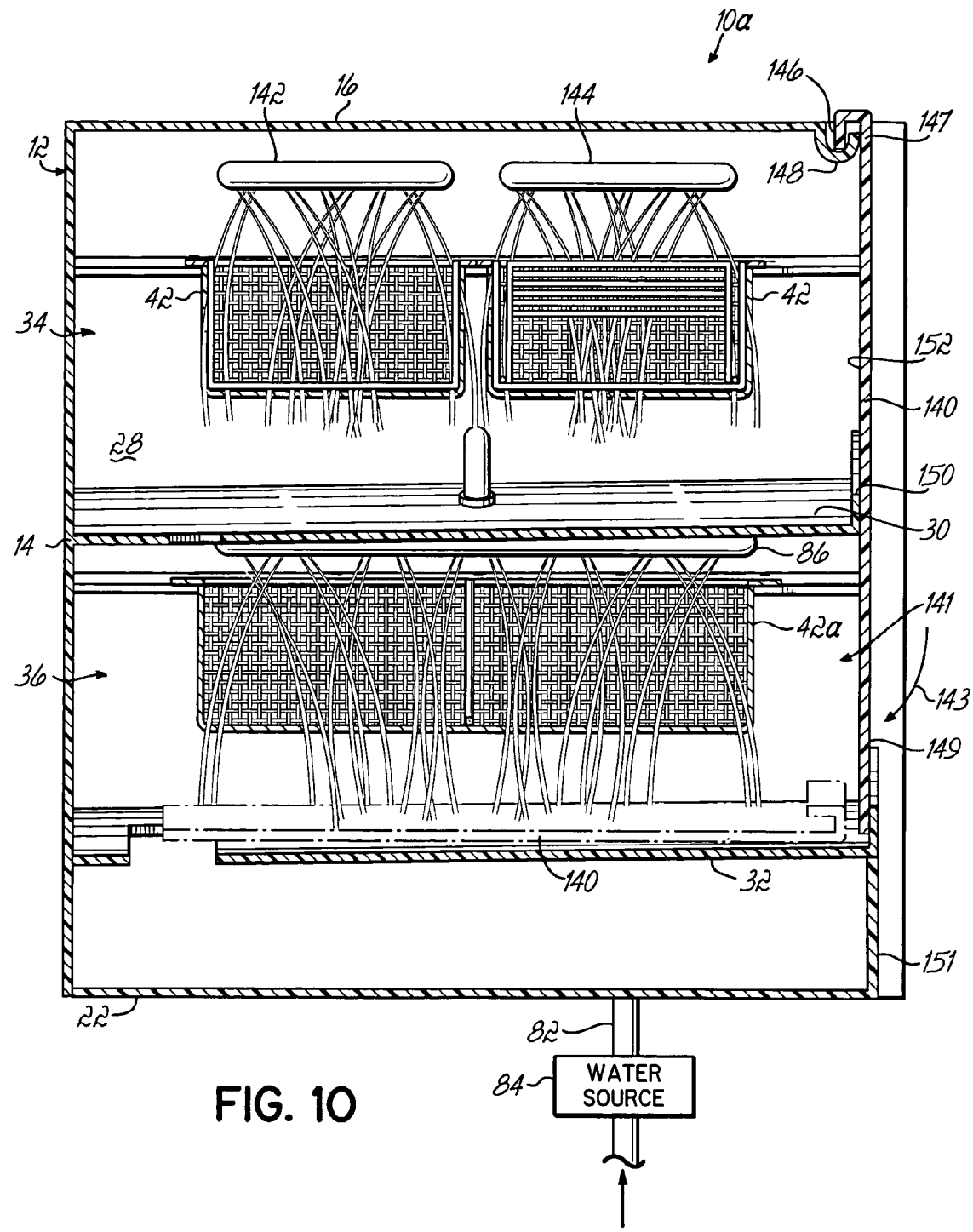
FIG. 10 is a side view in partial cross-section of the food thawer of FIG. 9.

With reference to FIGS. 9 and 10 in which like reference numerals refer to like features in FIGS. 1-5 and in accordance with an alternative embodiment of the invention, a food thawer 10a may have a construction that omits the fans 52 on the airflow inlet and outlet ports 48, 50 and a closure configured as a stowable door 140 (FIG. 10) that differs in operation from opposed hinged doors 25, 26 (FIG. 1). The stowable door 140 is dimensioned and shaped to be optionally stored within the enclosure 12 when removed to permit access to the thawing baskets 42 supported inside the upper tier 34 of the thawing chamber 28 and to a thawing basket 42a supported inside the lower tier 36 of the thawing chamber 28. Thawing basket 42a is similar in construction to thawing basket 42, other than being larger dimensionally and thus having a larger capacity for holding frozen food 44.

Food thawer 10a includes two showerheads 142, 144, each similar in construction and operation to showerhead 86, that each overlie a corresponding one of the baskets 42 in upper tier 34. While showerheads 142, 144 shown in FIGS. 9 and 10 have a construction similar to showerhead 86, those of ordinary skill in the art will recognize that showerheads may also have a construction similar to showerheads 88a,b. Showerheads 142, 144 may include a pair of shut-off valves (not shown) similar to shut-off valves 98a,b wherein one valve is operative for selectively blocking water flow to showerhead 142 and the other valve is operative for selectively blocking water flow to showerhead 144. The shut-off valves may be used with thawing baskets 42 so that only a portion of tier 34 may be used to thaw frozen food 44, if desired, while conserving water.

Stowable door 140 is a single sheet of thin material that includes a flange 146 at an upper end 147 that, during operation of the food thawer 10a, is engaged with a complementary-shaped slot 148 extending across the width of the top wall 16. An end of the flange 146 extends downwardly into the slot 148 to provide resistance against outward movement of the door 140 from the force of the controlled temperature water expelled from the showerheads 86, 142, 144. One end 150 of the dividing wall 30 contacts an inner surface 152 of the door 140 to provide resistance against inward movement of the door 140 against a deflection force directed inwardly into the thawing chamber 28. A lower end 149 of the door 140 is positioned inside of a short vertical front wall 151 extending upwardly from bottom wall 22 such that water draining from the inner surface 152 is routed to the dividing wall 32 and to a drain 154. The front wall 151 also provides resistance against outward movement of the door 140. The lower end 149 of door 140 and end of vertical front wall 151 may be angled or inclined to correspond with the inclination of dividing wall 32.

An access opening, indicated generally by reference numeral 141, to the thawing chamber 28 is revealed by removing the stowable door 140. To that end, the door 140 is lifted by a vertical distance sufficient to remove flange 146 from slot 148 and moved outwardly until the flange 146 clears the top wall 16 of enclosure 12. The door 140 may be further displaced from the enclosure 12 and placed exteriorly of the food thawer 10a. Alternatively, the door 140 may be moved, as indicated generally by single-headed arrow 143, for storage in a stowed position atop the lower dividing wall 32 and, thus, kept inside the thawing chamber 28 while accessing the thawing baskets 42, 42a. If placed in this stowed position without significant outward movement, spent thawing water that resides on the inner surface 152 of door 140 is confined to drain inside the thawing chamber 28 and, as a result, will not escape the confines of the enclosure 12. The ability to store the door 140 in the stowed position may be advantageous for maintaining sterile conditions on surfaces surrounding the food thawer 10a.

Thawing water conduit 82 includes a temperature gauge 155 that may be used to determine the water temperature of the thawing water flowing to the showerheads 86, 142 and/or 144. In this respect temperature gauge 155 may be shared between the showerheads 86, 142 and 144 in the top and bottom tiers 34, 36. Respective quick-release couplings (not shown) connect branch 82a with showerheads 142, 144 and branch 82b with showerhead 86. This allows the food thawer 10a to be quickly and conveniently disconnected from water supply 84 and water conduit 82 for cleaning or other purposes.

Branch 82a of the thawing water conduit 82 includes a timer 156 used to program a duration for a thawing cycle that, at the conclusion thereof, may close the flow of water through branch 82a, thereby permitting unattended operation of the food thawer 10a. For instance timer 156 may include an internal valve (not shown) that closes at the end of a thawing cycle. Branch 82a also includes shut-off valve 91 for manually stopping the flow of water through branch 82a and out of showerheads 140, 142. Timer 156 may also constitute a countdown device that is used to set the duration of a thawing cycle and to provide an aural and/or visual indication at the conclusion of the thawing cycle. As recognized by those of ordinary skill in the art, the length of the thawing cycle will be contingent upon the amount of frozen food 44 to be thawed. Branch 82b of the thawing water conduit 82 likewise includes a timer 158 that closes conduit 82b at the end of a thawing cycle or that constitutes a countdown device that is used to set the duration of a thawing cycle and provide an aural and/or visual indication at the conclusion thereof. Branch 82b also includes shut-off valve 90 for manually stopping the flow of water through branch 82b and out of showerhead 86.

Figure 11:
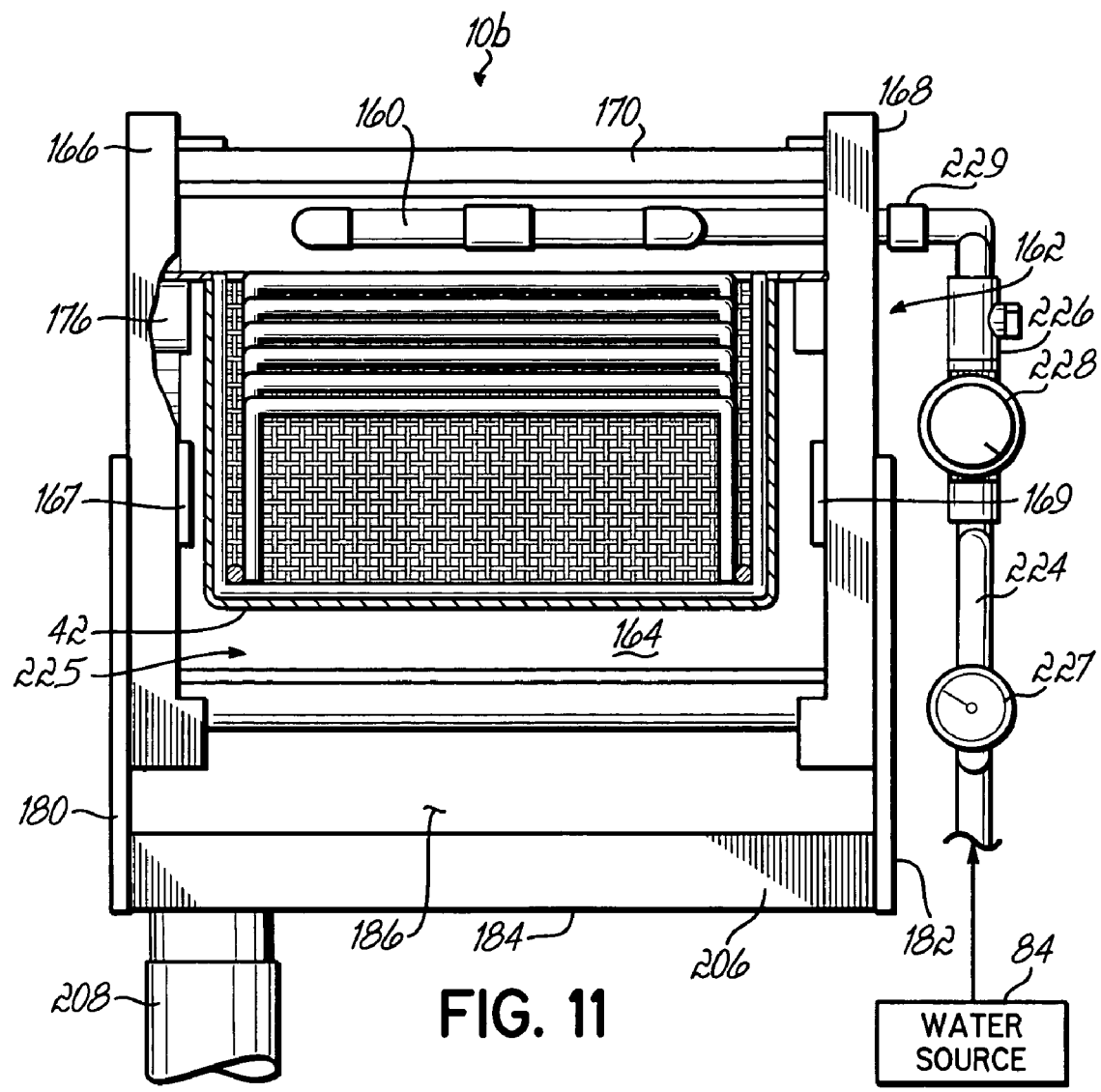
FIG. 11 is a front view of a food thawer in accordance with an alternative embodiment of the invention that is shown with the front door removed.
Figure 12:
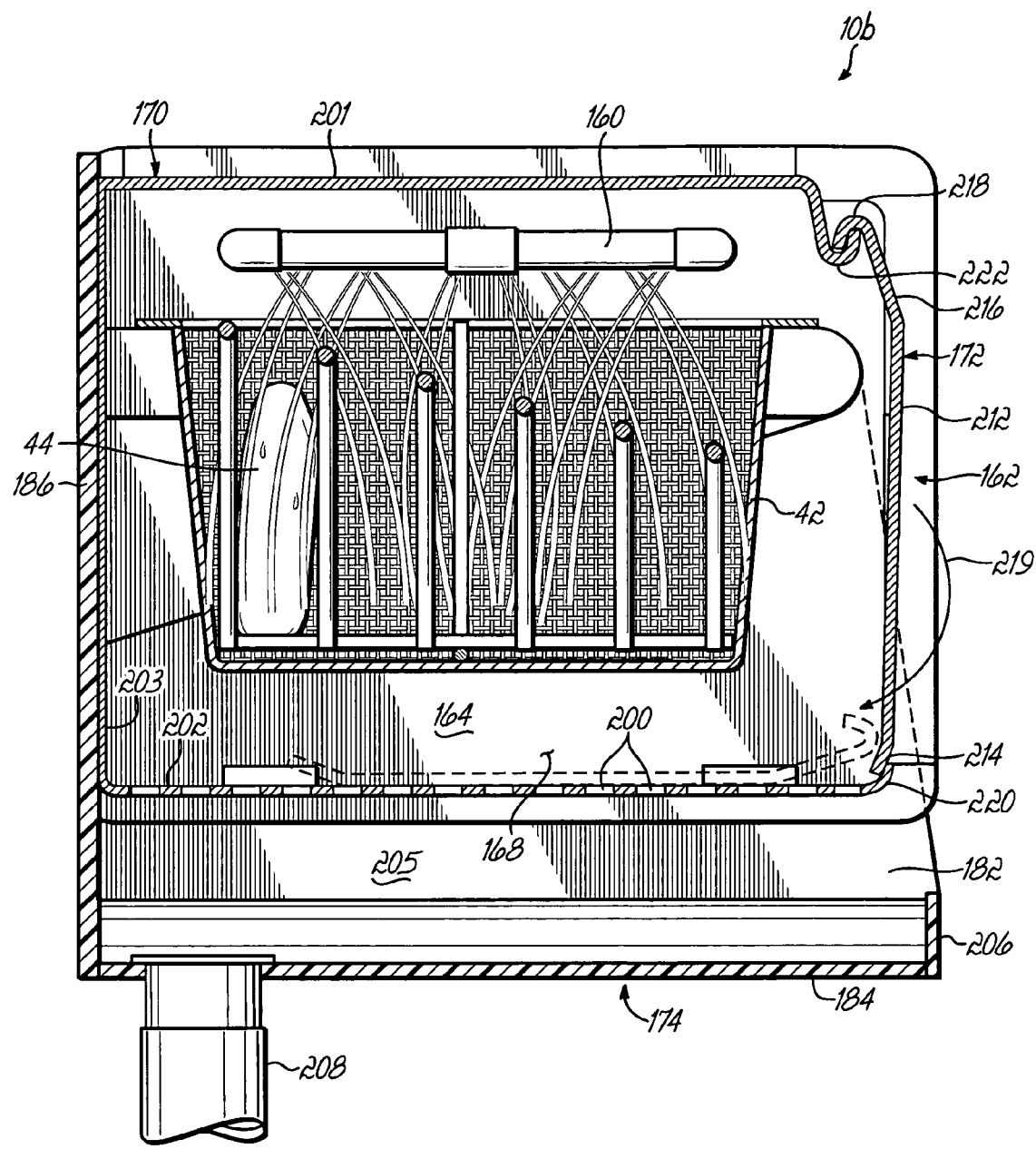
FIG. 12 is a side view in partial cross-section of the food thawer of FIG. 11.
Figure 13:
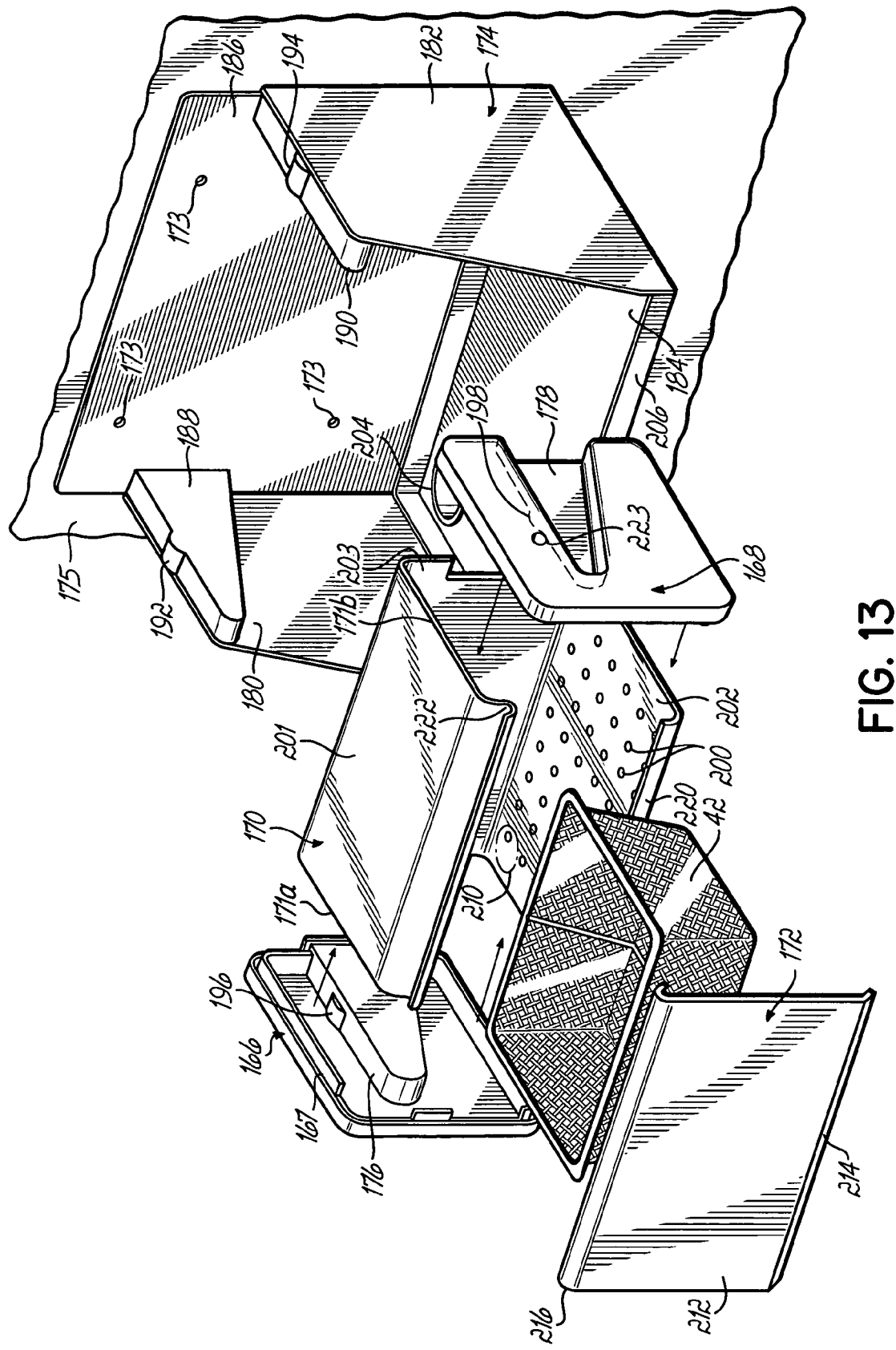
FIG. 13 is a disassembled view of the food thawer of FIGS. 11 and 12 shown with the showerhead removed for clarity.

With reference to FIGS. 11-13 in which like reference numerals refer to like features in FIGS. 1-5 and in accordance with an alternative embodiment of the invention, a food thawer 10b includes a single showerhead 160, similar to showerhead 86 (FIGS. 1-5), that is suspended generally above thawing basket 42. Food thawer 10b has an enclosure 162 that surrounds and bounds a thawing chamber 164 in which the thawing basket 42 is contained. The showerhead 160 directs a shower of temperature-controlled thawing water that bathes frozen food 44 held in the thawing basket 42 and, thereby, elevates the temperature of the frozen food 44 to induce thawing.

The enclosure 162, which confines the thawing water discharged from the showerhead 160 to the thawing chamber 164, consists of a pair of end caps 166, 168, a central chamber section 170 that is captured between the end caps 166, 168, and a stowable door 172, similar to door 140 (FIGS. 9, 10). The enclosure 162 is supported by a base 174, which may be considered to be part of the enclosure 162 or may be omitted in an alternative embodiment of the invention. When the food thawer 10b is operating, the central chamber section 170 and end caps 166, 168 are assembled and supported by base 174 and the door 172 covers an access opening, generally indicated by reference numeral 225, to the thawing chamber 164.

The assembly defining the enclosure 162 is formed by positioning the end caps 166, 168 in a flanking relationship with the central chamber section 170 and moving the end caps 166, 168 toward each other to engage the central chamber section 170. End cap 166 includes a rim 167 with projecting tabs that engages the side lip 171a of the thawing section 170. Similarly, end cap 168 includes a rim 169 with projecting tabs that engages the side lip 171b of the central chamber section 170. After the enclosure 162 is mounted to the base 174, the door 172 is attached to complete the assembly.

End cap 166 includes a tapered slot 176 that opens to the exterior of the enclosure 162. Similarly, end cap 168 includes a tapered slot 178 that also opens to the exterior of the enclosure 162. The base 174 includes a pair of end walls 180, 182 interconnected by a base wall 184 and a rear wall 186 to define a rigid structure open along the front and top sides. The base 174 is adapted to be affixed or mounted to a surface 175, such as a vertical kitchen surface, with conventional fasteners 173 that extend through a set of openings defined in rear wall 186. The invention contemplates that alternative fastening arrangements may be used to mount the base 174 to the surface 175 so as to, for example, quickly remove the base 174 from surface 175. Alternatively, the food thawer 10b may be supported on a countertop or other surface in the kitchen. Preferably, the food thawer 10b is positioned in the kitchen near a readily accessible drain and without interfering with the use of sinks in the kitchen. Wall-mounting the food thawer 10b frees surface area on, for example, countertops for other uses in food preparation.

The base 174 constitutes a stationary support structure for the remaining components of the food thawer 10b. The end caps 166, 168, the central chamber section 170, and, optionally, the door 172 constitute an assembly that may be inserted and removed from the base 174 as a unit while the base remains attached to surface 175. The assembly of the end caps 166, 168 and chamber section 170 may be disassembled for cleaning after separation from base 174, which may make cleaning more efficient and effective as all interior surfaces of the end caps 166, 168 and central chamber section 170 are easily accessed for contact with a cleaning and/or disinfecting solution.

The end wall 180 of base 174 includes a wedge-shaped support arm 188 that tapers in a direction away from the rear wall 186 and projects inwardly from the end wall 180. The wedge-shaped support arm 188 is dimensioned and shaped geometrically to fit within the slot 176 in end cap 166. Similarly, end wall 182 includes an inwardly-projecting, wedge-shaped support arm 190 that tapers in a direction away from the rear wall 186 and projects inwardly from end wall 182. The support arm 190 is dimensioned and shaped geometrically to fit within the slot 178 in end cap 168.

A detent 192 is located on an upper surface of wedge-shaped support arm 188 and engages a corresponding mating recess 196 formed in the slot 176 of end cap 166. A detent 194, which is located on an upper surface of wedge-shaped support arm 190, engages a corresponding mating recess 198 formed in the slot 178 of end cap 168. The engagement between the detents 192, 194 and mating recesses 196, 198 operates to restrict frontward movement of the assembly consisting of the end caps 166, 168 and the central chamber section 170. However, the curvature and height of the detents 192, 194 and the corresponding curvature and height of the mating recesses 196, 198 permits removal of the assembly by a transverse force of a sufficient magnitude and with minimal vertical movement.

The central chamber section 170 includes a series of perforations 200 extending entirely through the thickness of a lower or bottom wall 202. The thawing chamber 164 communicates through the perforations 200 with a space 205 defined between the bottom wall 202 of central chamber section 170 and the base wall 184 of base 174. The end caps 166, 168 extend below the bottom wall 202 and contact the base wall 184 to elevate the bottom wall 202 of the central chamber section 170 from the base wall 184 of base 174 and form the space 205. The perforations 200 supply a flow path for exhausting spent thawing water from the thawing chamber 164 into the space 205 for collection by base wall 184.

The central chamber section 170 further includes an upper or top wall 201, and a rear wall 203 that extends between and couples the top and bottom walls 201, 202. The end caps 166, 168 define spaced-apart side walls laterally bounding the thawing chamber 164. The showerhead 160, when installed, underlies the top wall 201 of the thawing chamber 164 and is positioned above the thawing basket 42, which overlies the bottom wall 202 of the thawing chamber 164. The showerhead 160 includes orifices (not shown) oriented to discharge thawing water downwardly toward the bottom wall 202 and to thereby bathe the frozen food 44 with a shower of the thawing water for elevating the temperature of the frozen food 44. As recognized by those of ordinary skill in the art, other showerheads may be used in the invention.

The base wall 184 includes a drain opening 204 and a front lip 206 that cooperate along with slanting of base wall 184 to direct the spent thawing water communicated through the perforations 200 toward drain opening 204. The drain opening 204 is connected with a drain conduit 208 that routes the spent thawing water to a drain for disposal. In an alternative embodiment of the present invention, the perforations 200 may be omitted from the bottom wall 202 and, instead, the bottom wall 202 may further include a drain opening 210 that is connected directly with the drain conduit 208 and slanting to direct the spent thawing water across the wetted surface of bottom wall 202 to the drain opening 210. In such an alternative embodiment, the central chamber section 170 may be mounted directly to surface 175 without the use of base 174 and the drain opening 210 may be coupled directly with drain conduit 208. Again, conventional fasteners or, preferably, quick release fasteners may be used to mount the central chamber section 170 to the surface 175.

The stowable door 172 of the food thawer 10b is removable from access opening 225 to afford access to the thawing basket 42 inside the thawing chamber 164. The door 172 includes a central panel 212, a lower flange 214 integral with a lower edge of the central panel 212, and an upper flange 216 integral with an upper edge of the central panel 212. The height and width of the door 172 are sufficient to close the access opening 225 and thereby complete the enclosure 162. The lower flange 214 is inclined at an acute angle relative to the plane of the central panel 212 and inwardly into the thawing chamber 164. The lower flange 214 inwardly overlaps with a curved front edge 220 of the bottom wall 202 of the thawing chamber 164 to reduce or prevent escape of thawing water from the enclosure 162.

The upper flange 216 of stowable door 172 includes a curved end 218 that, during operation of the food thawer 10b, is engaged with a complementary-shaped slot 222 extending along a front edge of the top wall 201 of central chamber section 170. The curved end 218 of flange 216 extends downwardly into the slot 222 to provide resistance against outward movement of the door 172 from the force of the controlled temperature water discharged from the showerhead 160 over frozen food 44 (FIG. 12). The stowable door 172 may be removed to permit access to the thawing chamber 164 by lifting the door 172 by a vertical distance sufficient to remove the end 218 of flange 216 from slot 222 and moving the door 172 outwardly until the flange 218 clears the front edge of the chamber section 170. The door 172 may be further displaced from the enclosure 162 and placed exteriorly of the food thawer 10b. Alternatively, the door 172 may be dimensioned and shaped so as to be movable to a stowed position atop the bottom wall 202 of central chamber section 170, as indicated generally by single-headed arrow 219, and, thus, kept inside the thawing chamber 164 while accessing the thawing basket 42. When the door 172 is removed and optionally stowed, the thawing chamber 164 is accessible through the access opening 225 for inserting and removing thawing basket 42.

The thawing basket 42 is supported inside the thawing chamber 164 by the inner edges of the contoured end caps 166, 168 that define the tapered slots 176, 178. The thawing basket 42 and now-thawed frozen food 44 therein are removable from the thawing chamber 164 by displacing door 172 from the access opening 225 and sliding the thawing basket 42 outwardly through the access opening 225. The procedure is reversed for inserting the thawing basket 42 and frozen food 44 into the access opening 225 to initiate a thawing cycle.

A thawing water conduit 224 couples the regulated-temperature water source 84 for transferring thawing water to the showerhead 160 of the food thawer 10b. The water conduit 224 extends vertically adjacent to the food thawer 10b and is bent to extend through an opening 223 in the end cap 168 to communicate with the showerhead 160. A temperature gauge 227 communicates with the interior of the water conduit 224 for determining the temperature of the thawing water flowing to the showerhead 160.

The water conduit 224 is coupled with the showerhead 160 by a hydraulic quick coupling 229. The showerhead 160 may be removed by disconnecting the quick coupling 229, accessing the showerhead 160 through the access opening 225, moving the showerhead 160 to remove the length of the showerhead 160 extending through opening 223 in the end cap 168, and then moving the showerhead 160 through the access opening 225. The showerhead 160 may be removed before removing the assembly consisting of the end caps 166, 168 and central chamber section 170 from base 174. Alternatively, the showerhead 160 may be removed after removing the assembly from the base 174.

The water conduit 224 includes a shut-off valve 226 that may be used to manually discontinue flow to the showerhead 160 and a timer 228 used to program a time for a thawing cycle that, at the conclusion thereof, may close the flow of water to showerhead 160. The timer 228 thus permits unattended operation of the food thawer 10b. Timer 228 may also constitute a countdown device that is used to set the duration of a thawing cycle and to provide an aural and/or visual indication at the conclusion of the thawing cycle. The length of the thawing cycle will be contingent upon the amount of frozen food 44 to be thawed. If the regulated-temperature water source 84 is operating, timer 228 is activated and shut-off valve 226 is open, a continuous stream of fresh thawing water is pumped from the water source 84 to the showerhead 160.

Figure 14:
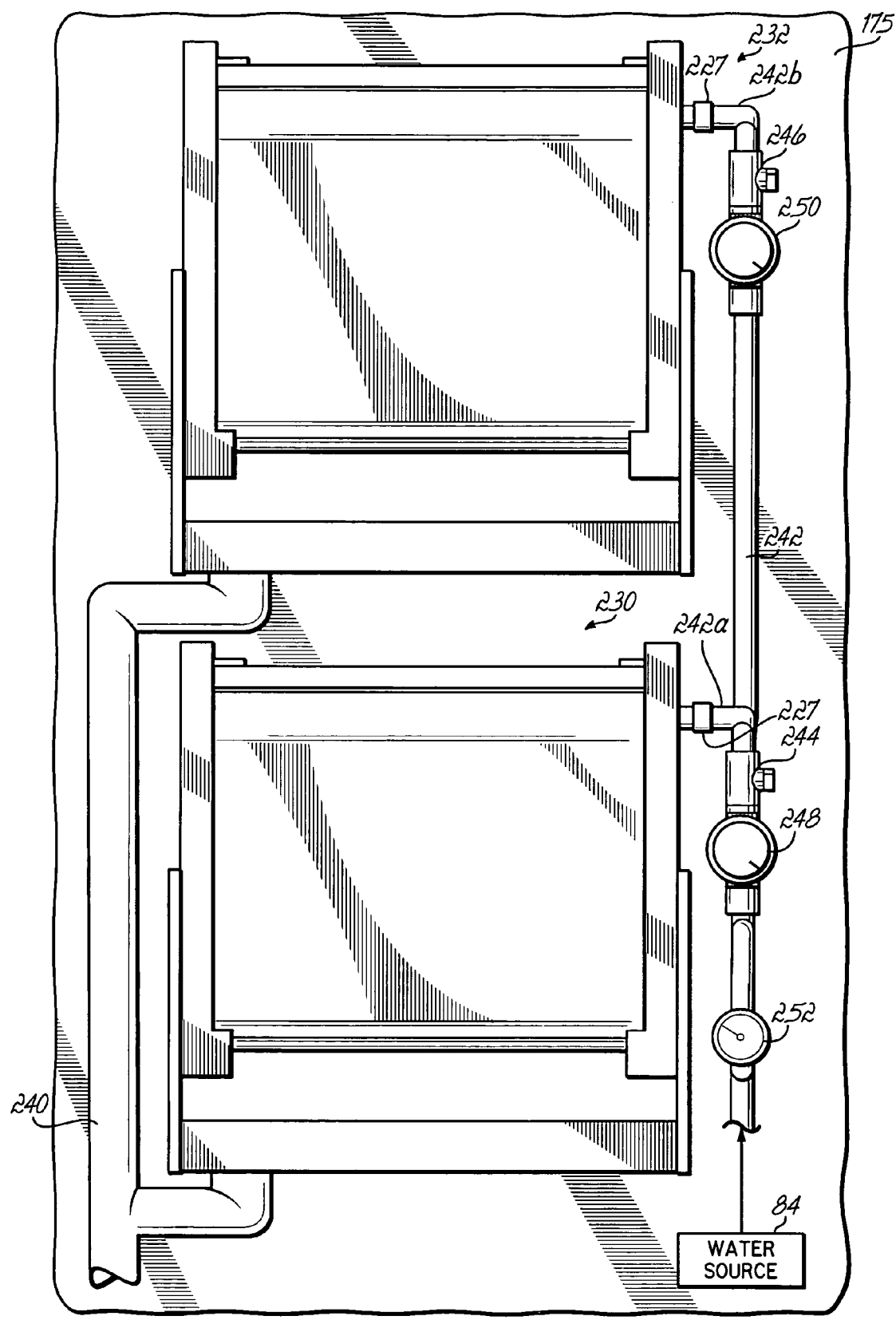
FIG. 14 is a front view of a pair of food thawers in accordance with an alternative embodiment of the invention.

With reference to FIG. 14 in which like reference numerals refer to like features in FIGS. 11-13 and in accordance with an alternative embodiment of the invention, a pair of food thawers 230, 232 may be mounted near each other to permit sharing of a drain conduit 240 and a thawing water conduit 242 carrying temperature-regulated water. Preferably, the food thawers 230, 232 are mounted to the surface 175 with a vertically stacked arrangement. Alternatively, food thawers 230, 232 may be configured to couple to a vertical rack (not shown) having a plurality of bays for receiving a food thawer. For instance, a vertical rack may have 3 bays to accommodate up to three food thawers. Those of ordinary skill in the art will recognize that the number of bays in the rack may vary depending on the specific application. Each of the food thawers 230, 232 has a construction similar or identical to food thawer 10b. The food thawers 230, 232 may be used for thawing a different type of frozen food as cross-contamination is not a concern. Nevertheless, the sharing of the drain conduit 240 and the water conduit 242 increases efficiency and reduces cost. For instance, the stacked configuration shown in FIG. 14 or the rack configuration discussed above can share a common water source 84 for supplying the temperature-regulated water, thus reducing hardware and costs.

The water conduit 242 includes a branch 242a leading to the lower food thawer 230 and a shut-off valve 244 in the branch 242a that may be used to discontinue flow to the lower food thawer 230. Similarly, the water conduit 242 includes another branch 242b leading to the upper food thawer 232 and a shut-off valve 246 in branch 242b that may be used to discontinue flow to the upper food thawer 232. The shut-off valves 244, 246 may be constructed and operate similar to shut-off valve 226. The water conduit 242 includes a timer 250 that may be used to set the duration of a timed thawing cycle to be performed by the upper food thawer 232 and a timer 248 that may be used to set the duration of a timed thawing cycle to be performed by the lower food thawer 230. The timers 248, 250 may be constructed and operate in a manner similar to timer 228. As a result, each of the food thawers 230, 232 may function independently and, optionally, in a semi-automated manner. The drain conduit 240 is commonly coupled with the drain opening (not shown) of both food thawers 230, 232 for removal of spent thawing water. A temperature gauge 252 communicates with water conduit 242 for determining the water temperature of the thawing water flowing to the showerheads (not shown) of the upper and lower food thawers 232, 230.

Figure 15:
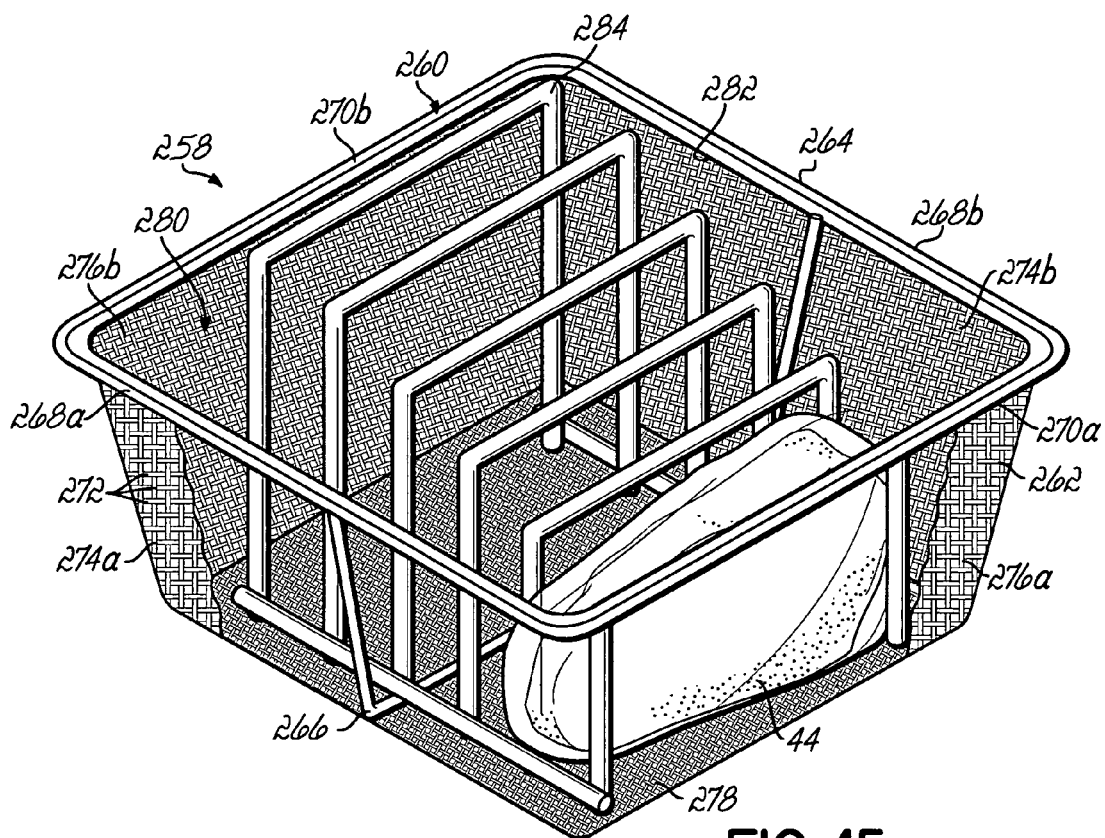
FIG. 15 is a perspective view of a thawing basket and rack in accordance with an alternative embodiment of the invention.
Figure 16:
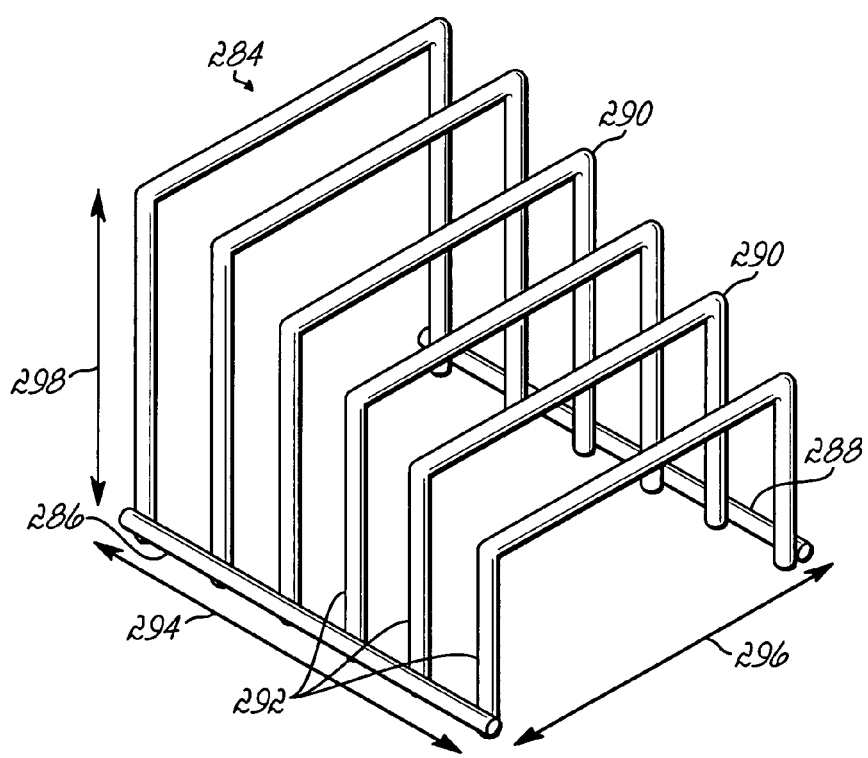
FIG. 16 is a perspective view of the rack in FIG. 15.

With reference to FIGS. 15 and 16, an exemplary thawing basket 258 that may be used with the various embodiments of the food thawers 10, 10a, 10b, 230, 232 includes a rigid frame 260 and an outer shell 262 coupled to frame 260 that collectively define the thawing basket 258. The rigid frame 260 includes an upper support flange 264 and an intermediate support 266 coupled to support flange 264. Support flange 264 may have a generally rectangular shape with a first pair of spaced-apart generally parallel sides 268a,b and a second pair of spaced-apart generally parallel sides 270a,b that connect sides 268a,b. Support flange 264 includes a bearing surface for supporting thawing basket 258 within the food thawer. Intermediate support 266 has a generally U-shaped configuration with one end coupled to a side of support flange 264, e.g., 268a, and the other end coupled to the opposed side of the support flange 264, e.g., 268b. The intermediate support 266 may be coupled with support flange 264 by bonding, welding or other means known in the art. Intermediate support 266 is generally positioned so as to bisect the sides to which it is coupled, although the invention is not so limited.

Outer shell 262 is preferably a wire mesh shell consisting substantially of openings 272 that allow the thawing water to easily pass through the thawing basket 258 while retaining the frozen food 44 contained in the basket 258. The outer shell 262 includes a first pair of opposed side walls 274a,b, a second pair of opposed side walls 276a,b and a bottom wall 278. The upper edges of side walls 274a,b are respectively coupled to sides 268a,b of support frame 264 and the upper edges of side walls 276a,b are respectively coupled to sides 270a,b of support frame 264. The outer shell 262, such as along side walls 274a,b and bottom wall 278 may also be coupled to intermediate support 266. Such a configuration defines the thawing basket 258 having a cavity 280 with an opening 282 for accessing the cavity. Frozen food 44 may be placed into and removed from cavity 280 through opening 282.

In one embodiment, frozen food 44 may be placed in the basket 258 and rest on bottom wall 278. In another embodiment of the invention, a rack 284 may be used in combination with the thawing basket 258 to make more efficient use of the space within the thawing basket 258 so as to facilitate the thawing process. Such a rack 284 is especially useful when the frozen food 44 comes as a pre-packaged unit, such as in individually sealed pouches containing a particular type of food product, e.g. vegetables, meats, etc. As shown in FIG. 16, the rack 284 generally includes two spaced-apart, generally parallel rails 286, 288 and a plurality of dividers 290 spaced along a length of the rails, each divider 290 having an end coupled to rail 286 and another end coupled to rail 288. In a preferred embodiment, each divider 290 is formed from a cylindrical rod member and configured to form a generally inverted U-shaped member wherein the ends of the U-shaped member are coupled to rails 286, 288. The plurality of dividers 290 separate the basket 258 into a plurality of slots 292 with each slot adapted to receive a frozen food 44 for thawing. The dividers 290 further keep the frozen food 44 within its associated slot during the thawing process.

While the dimensions of the rack 284 may vary, i.e., the length 294 and width 296 may be designed for a particular application, preferably, the rack 284 should substantially fill the thawing basket 258. To this end, and as shown in FIG. 15, the length 294 of the rack 284 may be substantially equal to one dimension of the bottom wall 278 of basket 258 and the width 296 of the rack 284 may be substantially equal to the other dimension of the bottom wall 278 of basket 258. Those of ordinary skill in the art will recognize that the rack 284 may be oriented within thawing basket 258 in any desired manner depending on the rack's dimensions.

In another aspect of the invention, the height 298 of each divider 290 may vary so as to accommodate different sizes of frozen food 44. As shown in FIGS. 15 and 16, the height 298 of the dividers 290 progressively increase along the length of the rack 284. The invention is not limited to the particular configuration shown as those of ordinary skill in the art will recognize that the height 298 of each divider 290 may be selected depending on the particular application. For instance, the rack 284 may have dividers 290 that all have the same height 298. This would be useful, for example, when a substantial amount of the frozen food 44 had the same or similar dimensions.

Figure 17A:
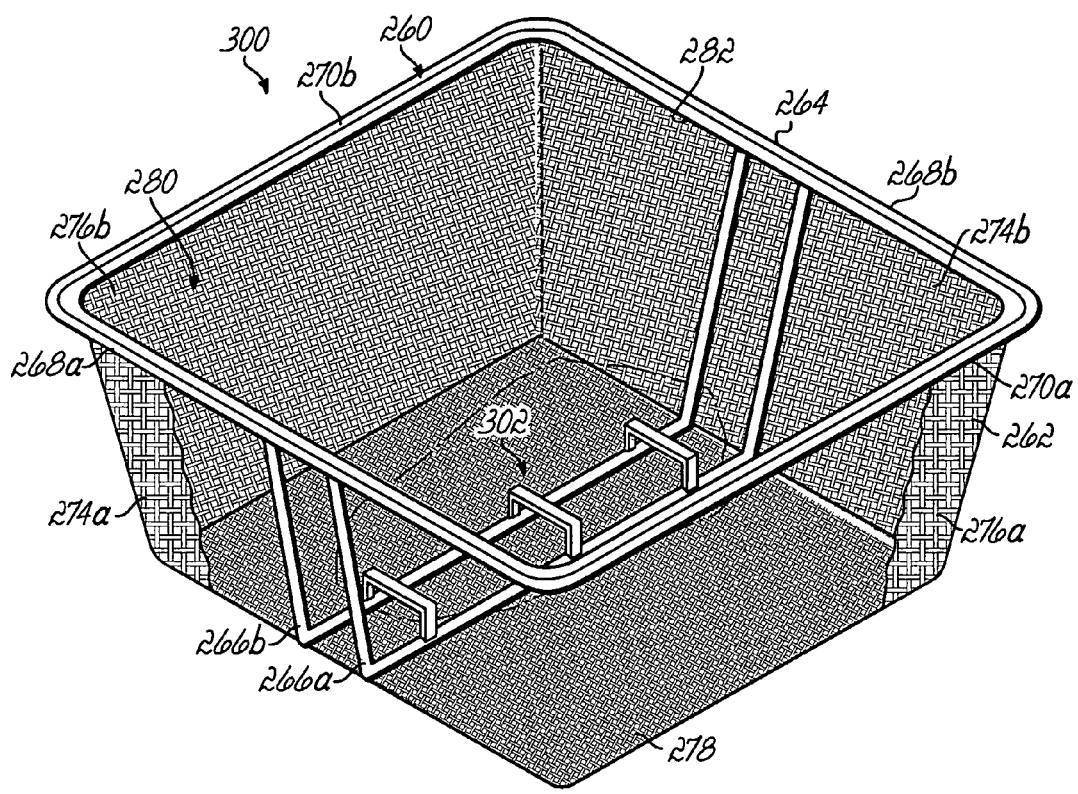
FIG. 17A is a perspective view of a thawing basket in accordance with an alternative embodiment of the invention.
Figure 17B:
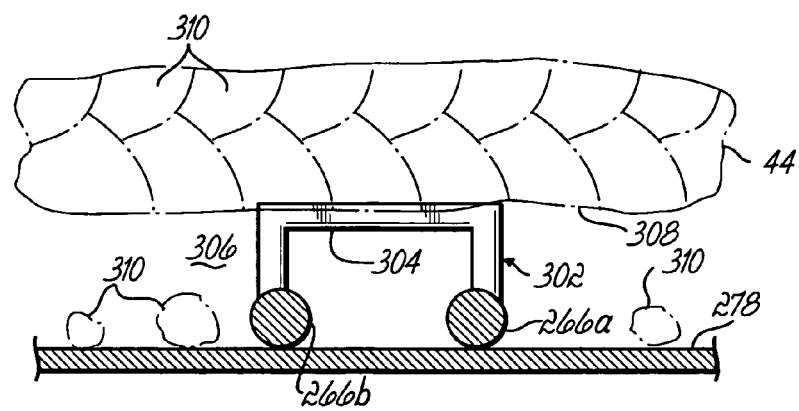
FIG. 17B is a front view in partial cross-section of the thawing basket of FIG. 17A.

With reference to FIGS. 17A and 17B, in which like reference numerals refer to like features in FIG. 15 and in accordance with an alternative embodiment of the invention, a thawing basket 300 includes two spaced-apart intermediate supports 266a,b, each similar to intermediate support 266. A plurality of vertically-projecting standoffs 302 (three shown) span a dimension of thawing basket 300 so as to raise frozen food 44 off the bottom wall 278 of thawing basket 300. In particular, standoffs 302 have an inverted U-shaped configuration with one end coupled to one intermediate support 266a and the other end coupled to the other intermediate support 266b. Each standoff 302 includes a leg 304 that is substantially parallel to bottom wall 278, but raised from bottom wall 278 to create a space 306 between the bottom wall 278 and the bottom surface 308 of the frozen food 44. This configuration allows the thawing water to circulate freely over the entire surface area of the frozen food 44, including the bottom surface 308. This basket configuration is particularly advantageous when the frozen food 44 is formed from an agglomerated mass of discrete portions 310. As thawing water flows over the frozen food 44 and thawing begins, individual pieces 310 break away from the agglomerated mass and are captured in the space 306 beneath the frozen food 44. As the food being thawed incrementally breaks away from the agglomerated mass, the standoffs 302 allow more of the surface area to be exposed to the thawing water, thereby decreasing the thawing time.

Figure 18:
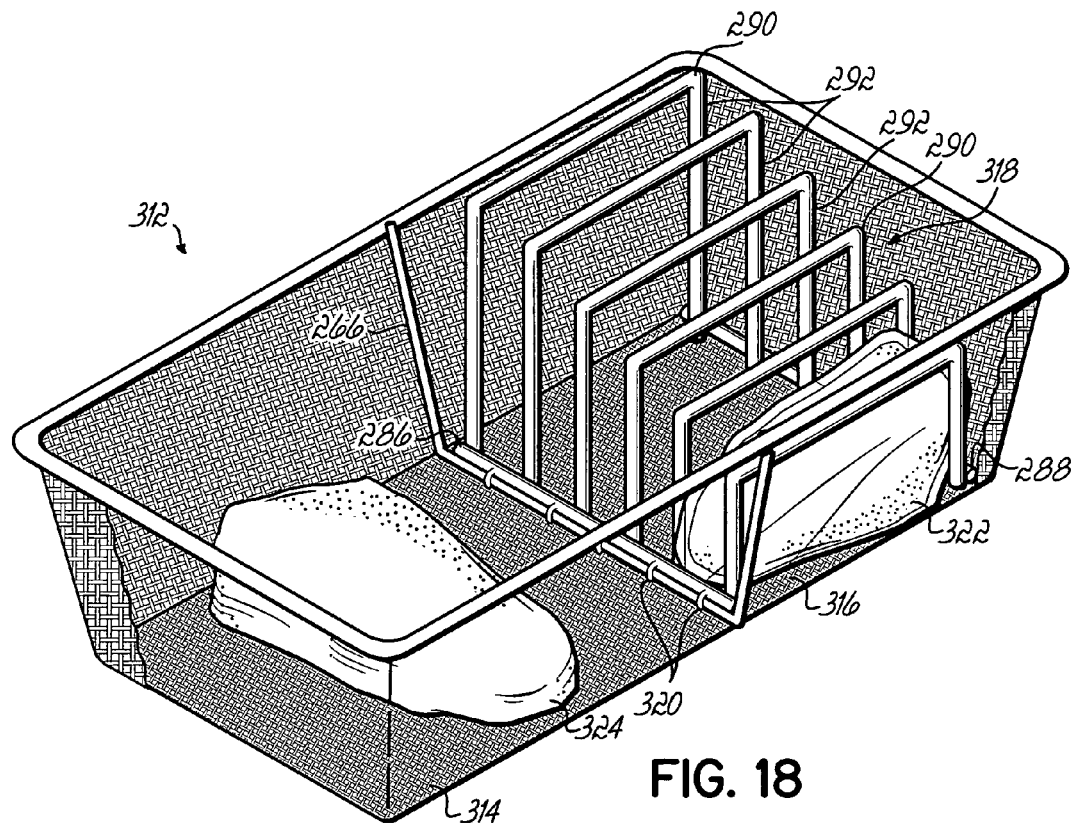
FIG. 18 is a perspective view of a thawing basket in accordance with an alternative embodiment of the invention.

With reference to FIG. 18 in which like reference numerals refer to like features in FIG. 15 and in accordance with an alternative embodiment of the invention, the intermediate support 266 separates the thawing basket 312 into a first section 314 and a second section 316. The basket 312 is sized such that a rack 318 may be placed in either the first or second sections 314, 316. A rack 318 may also be positioned in each of the first and second sections 314, 316. Rack 318 is substantially similar in construction and operation to rack 284. Rack 318, however, includes a plurality of connecting members 320 along at least one of the rails 286, 288 (shown on rail 286). The connecting members 320 may be formed integrally with rails 286, 288, as shown, or may be separate members added to rails 286, 288 during the manufacturing process or during a post manufacturing process. In any event, the connecting members 320 are adapted to receive the intermediate support 266 therein and thereby limit or prevent movement of the rack 318 relative to the thawing basket 312. To this end, the connecting members 320 may be hooked shaped defining a cavity for receiving the intermediate support 266 and an opening for accessing the cavity. The opening may be just slightly larger than the intermediate support 266 to allow the intermediate support 266 to be positioned in the cavity. Alternatively, the connecting members 320 may be slightly flexible to provide a snap-on/snap-off feature between the rack 318 and the thawing basket 312. In this way, a sufficient force is required to snap the rack 318 onto the intermediate support 266. A sufficient force is also required to remove the rack 318 from the intermediate support 266 and thus from the thawing basket 312.

In further reference to FIG. 18, when rack 318 is positioned in the second section 316 and not in the first section 314, different types of frozen foods may be thawed in the same thawing basket 312. For example, pouched foods 322 may be positioned within the food receiving slots 292 of rack 318 in second section 316 while a block of frozen food 324 may be positioned in first section 314. Additionally, different types of frozen foods may be positioned in the different sections of basket 312 without cross contaminating the frozen food.

Figure 19:
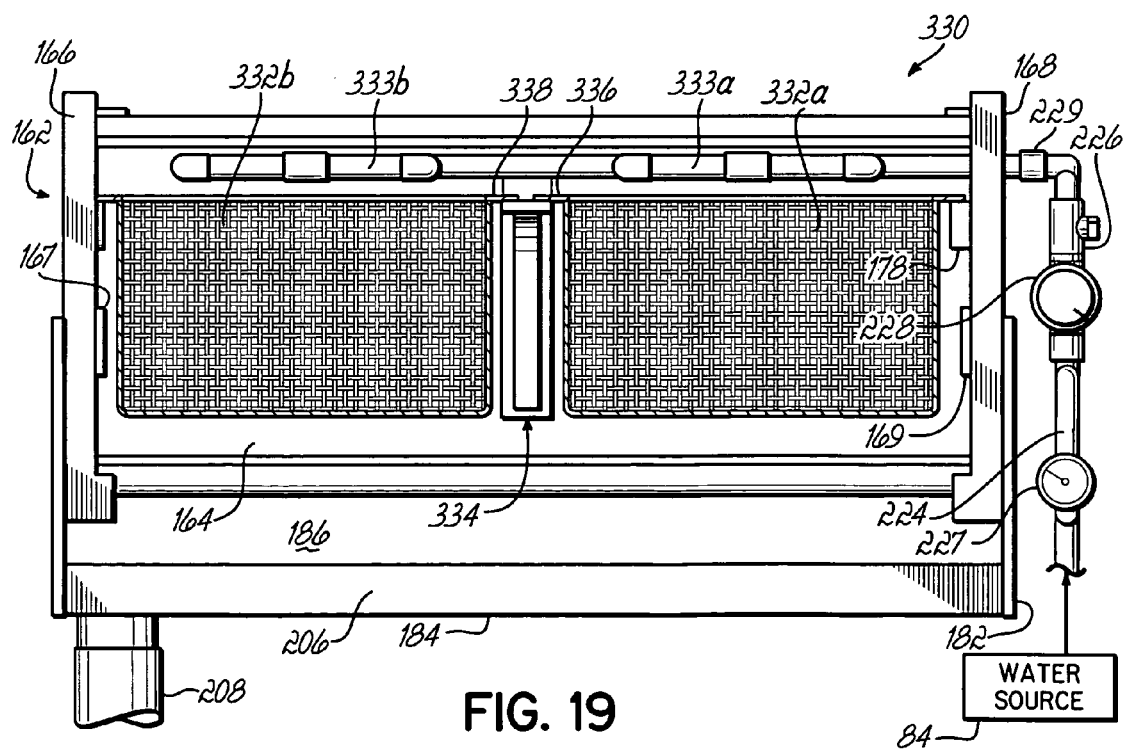
FIG. 19 is a front view of a food thawer in accordance with an alternative embodiment of the invention that is shown with the front door removed.
Figure 20:
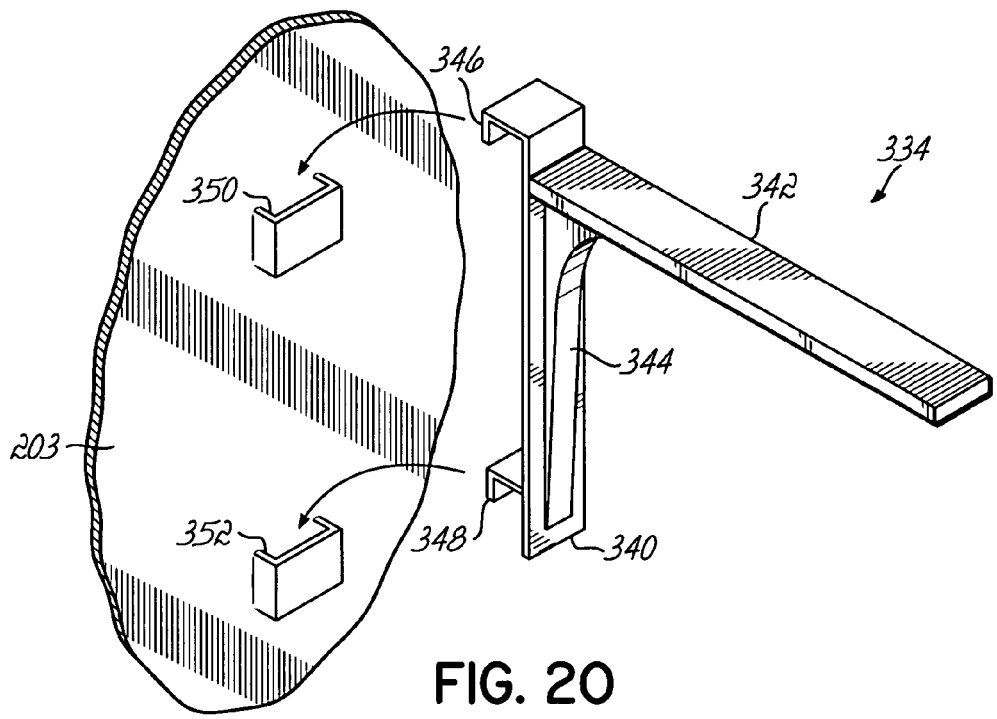
FIG. 20 is a perspective view of a basket support in accordance with one embodiment of the invention.
Figure 21:
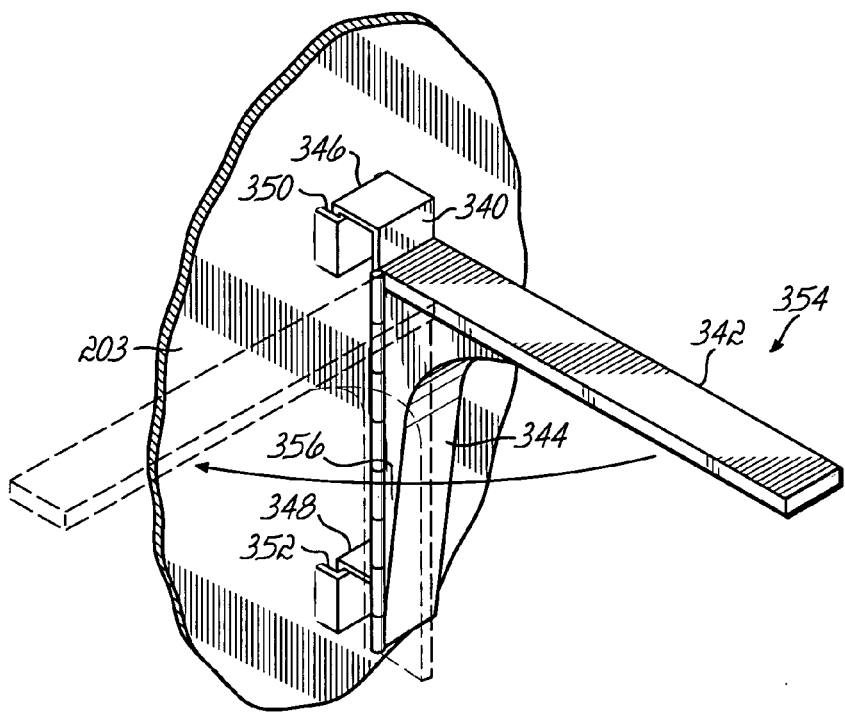
FIG. 21 is a perspective view of a basket support in accordance with an alternative embodiment of the invention.

With reference to FIGS. 19-21 in which like reference numerals refer to like features in FIGS. 11-13 and in accordance with an alternative embodiment of the invention, a food thawer 330 may have a thawing chamber 164 adapted to accommodate either a large thawing basket (not shown) or a pair of reduced thawing baskets 332a,b, similar to thawing basket 258. Food thawer 330 includes a pair of showerheads 333a,b similar to showerhead 160 that are suspended generally above thawing baskets 332a,b. When a large thawing basket is used in food thawer 330, the flanges of the basket are supported on the inner edges of the contoured end caps 166, 168 that define the tapered slots 176, 178. When the smaller thawing baskets 332a,b are used, however, a basket support 334 must be used to support the inner sides 336, 338 of baskets 332a,b, respectively. The basket support 334 is preferably configured so as to permit an operator to quickly change between using a large basket or two smaller baskets and vice versa.

To this end and in one embodiment of the invention, the basket support 334 may be configured as a generally L-shaped member having a first leg 340 adapted to be removably coupled to the rear wall 203 of the central chamber section 170 and a second leg 342 extending generally perpendicularly to first leg 340 and projecting into thawing chamber 164 from rear wall 203 and toward access opening 225. A web 344 may be coupled to both the first and second legs 340, 342 to provide strength and support to second leg 342. First leg 340 includes a pair of spaced, downward extending detents 346, 348 which cooperate with a pair of spaced, slots 350, 352 in rear wall 203 and adapted to receive detents 346, 348, respectively. To install the basket support 334, first leg 340 is positioned adjacent rear wall 203 such that the detents 346, 348 are above and aligned with the slots 350, 352. The basket support 334 is then moved in a downward direction to position detents 346, 348 in slots 350, 352 and thereby secure basket support 334 to food thawer 330. Once installed, the second leg 342 supports the inner sides 336, 338 of baskets 332a,b. The basket support 334 may be removed by moving the basket support in an upward direction until the detents 346, 348 are clear the slots 350, 352. Such a configuration allows the basket support 334 to be easily installed and removed from food thawer 330 so as to accommodate either a large thawing basket or a pair of reduced thawing baskets.

With reference to FIG. 21 in which like reference numerals refer to like features in FIG. 20 and in accordance with an alternative embodiment of the invention, basket support 354 may be configured such that second leg 342 is rotatable with respect to first leg 340. In this way, second leg 342 may be rotated to a first position adjacent rear wall 203 (shown in phantom) such that thawing chamber 164 may accommodate a large thawing basket. Second leg 342 may also be rotated to a second position projecting into thawing chamber 164 such that thawing chamber 164 may accommodate the two reduced thawing baskets 332a,b as shown in FIG. 19. Thus, instead of installing and removing the basket support from the food thawer 330, as with basket support 334, in this embodiment, the second leg 342 is rotated between its first and second positions to accommodate the different sized thawing baskets. To this end, the second leg 342 and web 344 may be coupled to first leg 340 via a hinge mechanism 356 that allows second leg 342 to rotate relative to first leg 340. Those of ordinary skill in the art will recognize that the hinge mechanism 356 may be positioned on the opposite side as shown so that second leg 342 rotates in the opposite direction to that shown in FIG. 21. Those of ordinary skill in the art will also recognize a wide range of hinge mechanisms that may be used in the invention.

Figure 22:
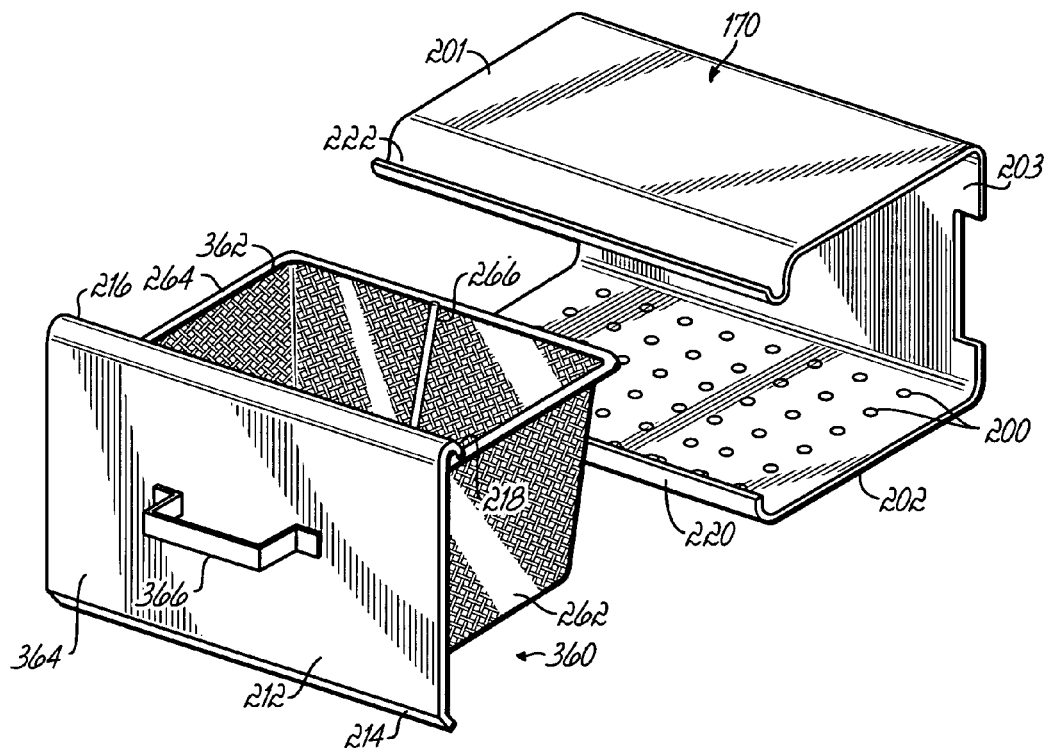
FIG. 22 is a perspective view of a basket assembly in accordance with one embodiment of the invention.

With reference to FIG. 22 in which like reference numerals refer to like features in FIGS. 11-13 and in accordance with an alternative embodiment of the invention, the closure to the food thawer and the thawing basket may be formed as an integral unit instead of as separate elements. To this end, basket assembly 360 may be configured as a drawer and include a thawing basket 362 similar to thawing basket 258 and a door 364. The door 364 may be formed as an integral part of basket 362 or may be separate and rigidly coupled to thawing basket 362, such as by welding. The thawing basket 362 and door 364 form a unitary structure that may be inserted and removed from a food thawer as a single unit. The door 364 has a construction similar to door 172 including a central panel 212, a lower flange 214 integral with a lower edge of the central panel 212, and an upper flange 216 integral with an upper edge of the central panel 212. The lower flange 214 is inclined at an acute angle relative to the plane of the central panel 212. The lower flange 214 overlaps with a curved front edge 220 of the bottom wall 202 of the central chamber section 170 to reduce or prevent escape of thawing water from the thawing chamber. The upper flange 216 of door 364 includes a curved end 218 that, during operation of the food thawer, is engaged with a complementary-shaped slot 222 extending along a front edge of the top wall 201 of central chamber section 170. The curved end 218 of flange 216 extends downwardly into the slot 222 to provide resistance against outward movement of the basket assembly 360 from the force of the controlled temperature water. A handle 366 may be coupled to door 364 to allow the basket assembly 360 to be easily inserted into and removed from a food thawer.

Figure 23:
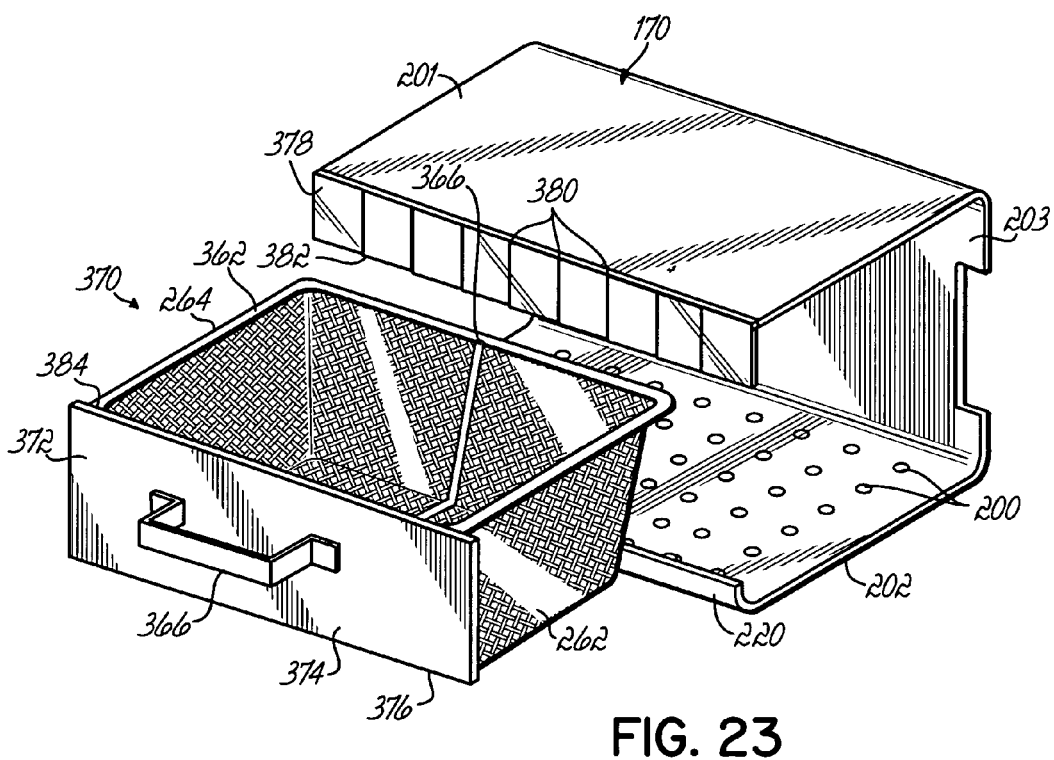
FIG. 23 is a perspective view of a basket assembly in accordance with an alternative embodiment of the invention.

With reference to FIG. 23 in which like reference numerals refer to like features in FIG. 22 and in accordance with an alternative embodiment of the invention, basket assembly 370 includes a door 372 having a generally planar panel 374. The lower edge 376 of door 372 abuts the curved front edge 220 of the bottom wall 202 of the central chamber section 170. The front edge of the top wall 201 of central chamber section 170 includes a flap 378 hanging downward from the front edge. Flap 378 may be formed from a thick plastic material and include a plurality of vertical slits 380. The length of flap 378 is configured such that the lower end 382 of the flap 378 is adjacent the upper edge 384 of the door 372 when inserted into a food thawer. The flap 378 is adapted to reduce of prevent escape of thawing water from the food thawer during operation. Door 372 also includes a handle 366 to facilitate insertion and removal of basket assembly 370 from a food thawer.

References herein to terms such as "front", "rear", "top", "bottom", "upward", "downward", etc. are made by way of example, and not by way of limitation, to establish a frame of reference. It is understood that various other frames of reference may be employed for describing the present invention without departing from the spirit and scope of the present invention.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. For example, the thawer of the invention may be used to thaw other types of frozen items, such as frozen blood products or human organs. The invention in its broader aspects is therefore not limited to the specific details, representative apparatus and methods, and illustrative examples shown and described. Accordingly, departures may be made from such details without departing from the spirit or scope of applicant's general inventive concept.

The scope of the invention itself should only be defined by the appended claims, wherein I claim:

1. An apparatus for thawing frozen food items, comprising:
   an enclosure having a top wall, a bottom wall, and a side wall extending between the top and bottom walls and defining a thawing chamber, wherein one of the top wall, bottom wall, or side wall includes an access opening to the thawing chamber;
   a first receptacle inside the thawing chamber and configured to hold frozen food items;

a first showerhead adapted to discharge a shower of water onto frozen food items held by the first receptacle in the thawing chamber;

a closure associated with the enclosure and movable between opened and closed positions, the thawing chamber being accessible through the access opening when the closure is in the opened position, and the closure covering the access opening when the closure is in the closed position;

a rear wall extending between the top and bottom walls;

a chamber section defined by the top, bottom and rear walls;

a pair of end caps defining in combination the side wall and coupled to the chamber section to define the enclosure;

a base underlying the enclosure and spaced from the bottom wall; and a spaced-apart pair of support arms associated with the base, each of the end caps being supported on a corresponding one of the support arms when the enclosure is coupled to the base.

2. The apparatus of claim 1 wherein the closure is removable from the enclosure to define the opened position.

3. The apparatus of claim 2 wherein the closure is configured for positioning inside the thawing chamber when in the opened position.

4. The apparatus of claim 1 wherein the closure is configured to resist movement away from the enclosure in at least one direction when in the closed position.

5. The apparatus of claim 1 wherein the first showerhead is spaced from the closure.

6. The apparatus of claim 1 wherein the first receptacle is a perforated thawing basket.

7. The apparatus of claim 1 wherein the access opening is in the side wall.

8. The apparatus of claim 1 further comprising:
a second showerhead adjacent the first showerhead and adapted to discharge a shower of water inside the thawing chamber.

9. The apparatus of claim 8 further comprising:
a second receptacle inside the thawing chamber and configured to hold frozen food items, the second showerhead adapted to discharge a shower of water onto frozen food items held by the second receptacle.

10. The apparatus of claim 8 wherein the second showerhead is positioned between the first showerhead and the bottom wall.

11. The apparatus of claim 8 further comprising:
a water conduit supplying a stream of water to the first and second showerheads; and
first and second valves coupled with the water conduit, the first valve operative for regulating the flow of water to the first showerhead, and the second valve operative for regulating the flow of water to the second showerhead.

12. The apparatus of claim 8 further comprising:
a dividing wall positioned between the top and bottom walls for partitioning the thawing chamber into first and second compartments, the first compartment containing the first showerhead, and the second compartment containing the second showerhead.

13. The apparatus of claim 1 further comprising:
a detent on each of the support arms; and
a recess on each of the end caps, the detents engaging the recesses when the enclosure is coupled to the base.

14. The apparatus of claim 1 wherein the base is adapted to be affixed to a vertical surface, and the enclosure is movable relative to the base for coupling the enclosure with the base and uncoupling the enclosure from the base.

15. The apparatus of claim 1 further comprising:
a plurality of perforations in the bottom wall; and
a drain opening in the base, the thawing water draining through the perforations in the bottom wall to the drain opening in the base when the shower of water is discharged from the first showerhead.

16. The apparatus of claim 1 wherein the end caps are removable from the chamber section.

17. The apparatus of claim 1 further comprising:
a drain opening in the bottom wall for draining water from the thawing chamber when the shower of water is discharged from the first showerhead.

18. The apparatus of claim 1 further comprising:
a receptacle support coupled to the side wall and adapted to support the first receptacle within the thawing chamber.

19. The apparatus of claim 18 wherein the receptacle support comprises:
a first leg coupled to the enclosure; and
a second leg coupled to the first leg and projecting away from the enclosure and into the thawing chamber.

20. The apparatus of claim 19 wherein the second leg is pivotally movable between a first position wherein the second leg projects away from the enclosure and into the thawing chamber and a second position wherein the second leg is adjacent the enclosure.

21. An apparatus for thawing frozen food items, comprising:
an enclosure defining a thawing chamber, the enclosure comprising:
a chamber section having a top wall, a bottom wall and a rear wall extending between the top and bottom wall, a first open end and a second open end, the chamber section further including an access opening;
a first end cap removably coupled to the chamber section to cover the first open end; and
a second end cap removably coupled to the chamber section to cover the second open end;
a closure removably coupled to the enclosure and movable between opened and closed positions, the thawing chamber being accessible through the access opening when the closure is in the opened position, and the closure covering the access opening when the closure is in the closed position, wherein the closure is positioned inside the thawing chamber when in the opened position;
a first showerhead spaced from the closure and adapted to discharge a shower of water onto frozen food items inside the thawing chamber; and
a base adapted to support the enclosure, the enclosure being movable relative to the base for coupling the enclosure with the base and uncoupling the enclosure with the base, the bottom wall being spaced from the base when the enclosure is coupled to the base, the base further including a drain opening, wherein the water drains through the drain opening when the shower of water is discharged from the first showerhead.

* * * * *